US011412243B2

(12) United States Patent
Chujoh et al.

(10) Patent No.: US 11,412,243 B2
(45) Date of Patent: Aug. 9, 2022

(54) VIDEO DECODING APPARATUS

(71) Applicants: Sharp Kabushiki Kaisha, Sakai (JP); FG Innovation Company Limited, New Territories (HK)

(72) Inventors: Takeshi Chujoh, Sakai (JP); Eiichi Sasaki, Sakai (JP); Tomonori Hashimoto, Sakai (JP); Tomoko Aono, Sakai (JP); Tomohiro Ikai, Sakai (JP)

(73) Assignees: SHARP KABUSHIKI KAISHA, Sakai (JP); FG INNOVATION COMPANY LIMITED, New Territories (JP)

( * ) Notice: Subject to any disclaimer, the term of this patent is extended or adjusted under 35 U.S.C. 154(b) by 0 days.

(21) Appl. No.: 17/299,812

(22) PCT Filed: Dec. 3, 2019

(86) PCT No.: PCT/JP2019/047253

§ 371 (c)(1),
(2) Date: Jun. 4, 2021

(87) PCT Pub. No.: WO2020/116456

PCT Pub. Date: Jun. 11, 2020

(65) Prior Publication Data

US 2021/0392356 A1 Dec. 16, 2021

(30) Foreign Application Priority Data

Dec. 7, 2018 (JP) ............................ JP2018-230199

(51) Int. Cl.

| | |
|---|---|
| ***H04N 19/44*** | (2014.01) |
| ***H04N 19/52*** | (2014.01) |
| ***H04N 19/105*** | (2014.01) |
| ***H04N 19/139*** | (2014.01) |
| ***H04N 19/172*** | (2014.01) |
| ***H04N 19/109*** | (2014.01) |
| ***H04N 19/70*** | (2014.01) |

(52) U.S. Cl.
CPC .......... *H04N 19/44* (2014.11); *H04N 19/105* (2014.11); *H04N 19/109* (2014.11); *H04N 19/139* (2014.11); *H04N 19/172* (2014.11); *H04N 19/52* (2014.11); *H04N 19/70* (2014.11)

(58) Field of Classification Search
CPC ....... H04N 19/109; H04N 19/70; H04N 19/52
See application file for complete search history.

(56) References Cited

U.S. PATENT DOCUMENTS

| | | | | |
|---|---|---|---|---|
| 11,259,044 | B2 * | 2/2022 | Jeong .................. | H04N 19/176 |
| 2021/0243476 | A1 * | 8/2021 | Ko ...................... | H04N 19/463 |

(Continued)

OTHER PUBLICATIONS

NPL Google Search; 2022. (Year: 2022).*

(Continued)

*Primary Examiner* — Luis Perez-Fuentes
(74) *Attorney, Agent, or Firm* — Keating & Bennett, LLP

(57) ABSTRACT

An image decoding apparatus is implemented that can suppress a decrease in coding efficiency in a case that a high compression rate is achieved. The image decoding apparatus includes a parameter decoder, and the parameter decoder decodes a skip flag indicating whether a skip mode is applied, and in a case that the skip flag does not indicate the skip mode, decodes a merge flag indicating whether a merge mode is applied, and in a case that the merge flag does not indicate the merge mode, decodes an MMVD flag indicating whether an MMVD mode is applied.

5 Claims, 20 Drawing Sheets

(56) References Cited

U.S. PATENT DOCUMENTS

| | | | | |
|---|---|---|---|---|
| 2021/0329292 | A1* | 10/2021 | Jeong | H04N 19/176 |
| 2021/0360277 | A1* | 11/2021 | Jeong | H04N 19/513 |
| 2021/0400294 | A1* | 12/2021 | Chen | H04N 19/13 |
| 2022/0070469 | A1* | 3/2022 | Kurashige | H04N 19/139 |

OTHER PUBLICATIONS

Library USPTO query for NPL; 2022. (Year: 2022).*
DMVR with motion vector difference mirroring; Esenlik—Jul. 2018. (Year: 2018).*
Algorithm description for Versatile Video Coding and Test model; Jan. 2018. (Year: 2018).*
Algorithm description for Versatile Video Coding and Test model; Oct. 2019. (Year: 2019).*
Official Communication issued in International Patent Application No. PCT/JP2019/047253, dated Feb. 10, 2020.
Esenlik et al., "Simplified DMVR for inclusion in VVC", Joint Video Experts Team (JVET) of ITU-T SG 16 WP 3 and ISO/IEC JTC 1/SC 29/WG 11, JVET-L0670, Oct. 3-12, 2018, 5 pages.
Bross et al., "Versatile Video Coding (Draft 3)", Joint Video Experts Team (JVET) of ITU-T SG 16 WP 3 and ISO/IEC JTC 1/SC 29/WG 11, JVET-L1001-V4, Oct. 3-12, 2018, 193 pages.
Jeong et al., "CE4 Ultimate motion vector expression (Test 4.5.4)", Joint Video Experts Team (JVET) of ITU-T SG 16 WP 3 and ISO/IEC JTC 1/SC 29/WG 11, JVET-L0054, Oct. 3-12, 2018, 18 pages.

* cited by examiner (g)

| qt_split_cu_flag | mtt_split_cu_flag | mtt_split_cu_vertical_flag | mtt_split_cu_binary_flag | |
|---|---|---|---|---|
| 1 | – | – | – | (b) |
| 0 | 1 | 1 | 1 | (c) |
| | | | 0 | (e) |
| | | 0 | 1 | (d) |
| | | | 0 | (f) |
| 0 | 0 | – | – | (a) |

(a)

| base_candidate_idx | 0 | 1 |
|---|---|---|
| Nth MVP | 1st MVP | 2nd MVP |

(b)

{A1, B1, B0, A0, B2}

(c) DistanceTable

| distance_idx | 0 | 1 | 2 | 3 | 4 | 5 | 6 | 7 |
|---|---|---|---|---|---|---|---|---|
| Pixel distance | 1/4-pel | 1/2-pel | 1-pel | 2-pel | 4-pel | 8-pel | 16-pel | 32-pel |

(d) DirectionTable

| direction_idx | mvdUnit[0] | mvdUnit[1] |
|---|---|---|
| 0 | +1 | 0 |
| 1 | -1 | 0 |
| 2 | 0 | +1 |
| 3 | 0 | -1 |

| coding_unit( x0, y0, cbWidth, cbHeight ) { | Descriptor | |
|---|---|---|
| **skip_flag** | ae(v) | |
| if (skip_flag[x0][y0]) { | | |
| **mmvd_flag** | ae(v) | |
| if (mmvd_flag) { // mmvd | | |
| **base_candidate_idx** | ae(v) | mmvd_info() |
| **distance_idx** | ae(v) | |
| **direction_idx** | ae(v) | |
| } | | |
| else // skip | | |
| **merge_idx** | ae(v) | |
| … | | |
| } else { | | |
| **merge_flag** | ae(v) | |
| if (merge_flag) { // mmvd | | |
| **mmvd_flag** | ae(v) | |
| if (mmvd_flag) { | | |
| **base_candidate_idx** | ae(v) | mmvd_info() |
| **distance_idx** | ae(v) | |
| **direction_idx** | ae(v) | |
| } | | |
| else // merge | | |
| **merge_idx** | ae(v) | |
| } | | |
| else { // AMVP | | |
| … | | |
| } | | |
| } | | |
| } | | |

FIG. 17

| coding_unit( x0, y0, cbWidth, cbHeight ) { | Descriptor |
|---|---|
| **skip_flag** | ae(v) |
| if (skip_flag[x0][y0]) { | |
| **merge_idx** | ae(v) |
| … | |
| } else { | |
| **merge_flag** | ae(v) |
| if (merge_flag) { // Merge | |
| … | |
| **merge_idx** | ae(v) |
| } else { | |
| **mmvd_flag** | ae(v) |
| if (mmvd_flag) { | |
| **base_candidate_idx** | ae(v) |
| **distance_idx** | ae(v) |
| **direction_idx** | ae(v) |
| }else { // AMVP | |
| … | |
| } | |
| } | |
| } | |

mmvd_info() (base_candidate_idx, distance_idx, direction_idx)

FIG. 19

| coding_unit( x0, y0, cbWidth, cbHeight ) { | Descriptor |
|---|---|
| **skip_flag** | ae(v) |
| if (skip_flag[x0][y0]) { // skip | |
| **merge_idx** | ae(v) |
| … | |
| } else { | |
| **merge_flag** | ae(v) |
| if (merge_flag) { | |
| **mmvd_flag** | ae(v) |
| if (mmvd_flag) { // mmvd | |
| **base_candidate_idx** | ae(v) |
| **distance_idx** | ae(v) |
| **direction_idx** | ae(v) |
| } | |
| else // merge | |
| **merge_idx** | ae(v) |
| } | |
| else { // AMVP | |
| … | |
| } | |
| } | |
| } | |

mmvd_info() (base_candidate_idx, distance_idx, direction_idx)

FIG. 21

VIDEO DECODING APPARATUS

TECHNICAL FIELD

The embodiment of the present invention relates to a video decoding apparatus and a video coding apparatus.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC and High-Efficiency Video Coding (HEVC), and the like.

In such a video coding scheme, images (pictures) constituting a video are managed in a hierarchical structure including slices obtained by splitting an image, coding tree units (CTUs) obtained by splitting a slice, units of coding (coding units; which will be referred to as CUs) obtained by splitting a coding tree unit, and transform units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

In addition, NPLs 1 to 3 are examples of a recent technique for video coding and decoding.

CITATION LIST

Non Patent Literature

NPL 1: "Versatile Video Coding (Draft 3)", JVET-L1001-v4, Joint Video Experts Team (JVET) of ITU-T SG 16 WP3 and ISO/IEC JTC 1/SC 29/WG 11, 2018 Dec. 3

NPL 2: "CE4 Ultimate motion vector expression (Test 4.5.4)" JVET-L0054-v4, Joint Video Exploration Team (JVET) of ITU-T SG 16 WP 3 and ISO/IEC JTC 1/SC 29/WG 11, Oct. 11, 2018

NPL 3: "Simplified DMVR for inclusion in VVC," JVET-L0670-v1, Joint Video Exploration Team (JVET) of ITU-T SG 16 WP 3 and ISO/IEC JTC 1/SC 29/WG 11, Oct. 6, 2018

SUMMARY OF INVENTION

Technical Problem

In a case where a high compression rate is achieved, flag information of added prediction parameter information becomes overhead, and this disadvantageously leads to reduced coding efficiency.

An object of the embodiment of the present invention is to realize an image decoding apparatus and an image coding apparatus that can suppress a decrease in coding efficiency in a case that a high compression rate is achieved.

Solution to Problem

In order to achieve the object described above, a video decoding apparatus according to an aspect of the present invention includes a parameter decoder configured to decode a parameter for generating a prediction image; and a prediction unit configured to obtain a motion vector by adding a motion vector difference to a motion vector derived from an index in a merge candidate list in a case that a Merge with Motion Vector Difference (MMVD) mode is used, wherein the parameter decoder decodes a skip flag indicating whether a skip mode in which no prediction residual is present is applied, in a case that the skip flag does not indicate the skip mode, the parameter decoder decodes a merge flag indicating whether a merge mode is applied that allows motion vector information to be obtained from a merge candidate, in a case that the merge flag indicates the merge mode, the parameter decoder decodes an MMVD flag indicating whether an MMVD mode is applied that allows motion vector information to be obtained by decoding, from coded data, motion vector information of a difference in a prescribed direction, in a case that the MMVD flag indicates the MMVD mode, the parameter decoder decodes an index in the merge candidate list, a first index indicating a length of the motion vector difference, and a second index indicating a direction of the motion vector difference, and in a case that the MMVD flag does not indicate the MMVD mode, the parameter decoder decodes a merge index, and the prediction unit derives the motion vector from the index in the merge candidate list, and derives the motion vector difference from the first index and the second index.

Additionally, in order to achieve the object described above, a video decoding apparatus according to an aspect of the present invention includes a parameter decoder configured to decode a parameter for generating a prediction image in a Merge with Motion Vector Difference (MMVD) mode and an MMVD prediction unit configured to obtain a motion vector for a merge candidate by adding a motion vector difference to a motion vector derived from an index in a merge candidate list, wherein the parameter decoder decodes the index in the merge candidate list, a first index indicating a length of the motion vector difference, and a second index indicating a direction of the motion vector difference, the MMVD prediction unit derives a motion vector for the merge candidate from the index in the merge candidate list, in a case that the merge candidate is a bi-prediction, a first vector is derived from the first index and the second index, and in a case that a distance between a target picture and a first picture is greater than a distance between the target picture and a second picture, a first motion vector difference between a target block on the target picture and the first picture is configured to be the first vector, and the first motion vector difference is scaled to derive a second motion vector difference between the target block and the second picture.

Advantageous Effects of Invention

According to the above-described configuration, an image decoding apparatus and an image coding apparatus can be realized that can suppress a decrease in coding efficiency in a case that a high compression rate is achieved.

BRIEF DESCRIPTION OF DRAWINGS

FIG. 17 is a diagram illustrating a syntax indicating the selection processing for a prediction mode according to the present embodiment.

FIG. 19 is a diagram illustrating a syntax indicating the selection processing for a prediction mode according to the present embodiment.

FIG. 21 is a diagram illustrating a syntax indicating the selection processing for a prediction mode according to the present embodiment.

DESCRIPTION OF EMBODIMENTS

First Embodiment

Hereinafter, an embodiment of the present invention will be described with reference to the drawings.

Figure 1:
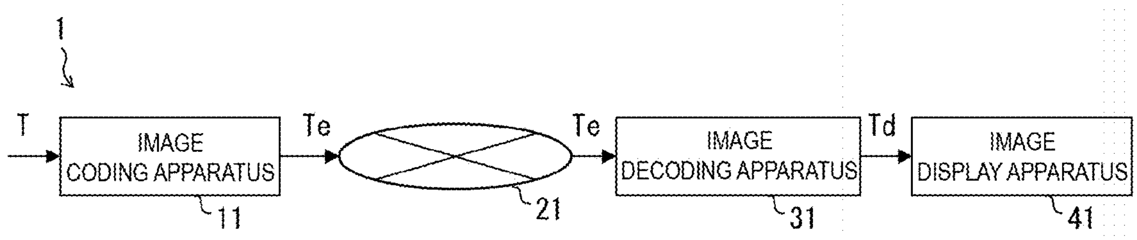
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. Furthermore, the network 21 may be substituted by a storage medium in which the coding stream Te is recorded, such as a Digital Versatile Disc (DVD: registered trade name) or a Blu-ray Disc (BD: registered trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-Luminescence (EL) display. Forms of the display include a stationary type, a mobile type, an HMD type, and the like. In addition, in a case that the video decoding apparatus 31 has a high processing capability, an image having high image quality is displayed, and in a case that the apparatus has a lower processing capability, an image which does not require high processing capability and display capability is displayed.

Operator

Operators used in the present specification will be described below.

>> is a right bit shift, << is a left bit shift, & is a bitwise AND, | is a bitwise OR, |= is an OR assignment operator, and || indicates a logical sum.

x ? y: z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

sign (a) is a function that returns the sign of a.

a^b represents the b-th power of a.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
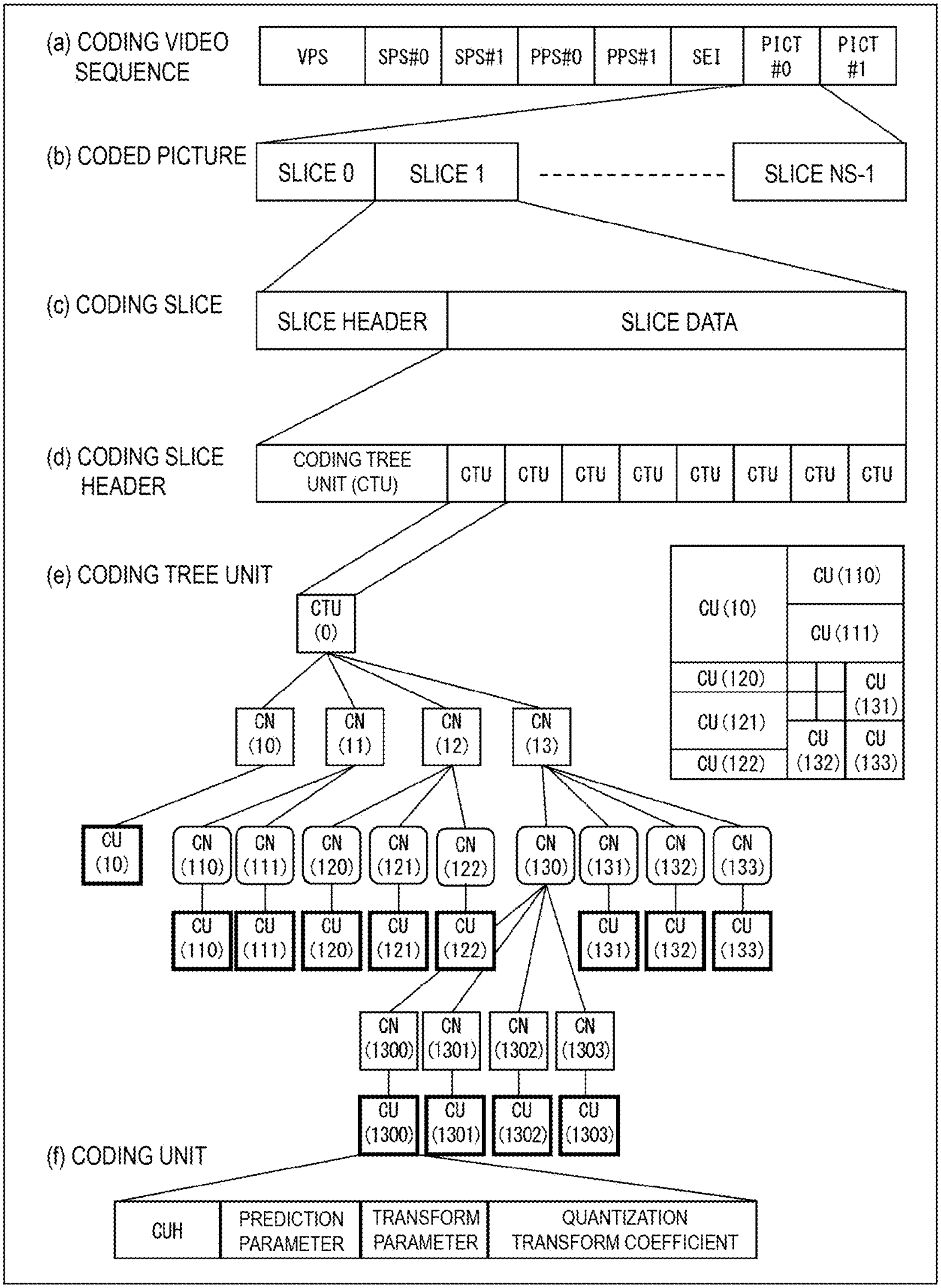
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. (a) to (f) of FIG. 4 are diagrams illustrating a coding video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit, respectively.

Coding Video Sequence

In the coding video sequence, a set of data referred to by the video decoding apparatus 31 to decode the sequence SEQ to be processed is defined. As illustrated in FIG. 4(*a*), the sequence SEQ includes a Video Parameter Set, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the video decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture and a flag (weighted_pred_flag) indicating an application of a weight prediction are included. Note that multiple PPSs may exist. In that case, any of the plurality of PPSs is selected from each picture in a target sequence.

Coded Picture

In the coded picture, a set of data referred to by the video decoding apparatus 31 to decode the picture PICT to be processed is defined. As illustrated in FIG. 4(*b*), the picture PICT includes a slice 0 to a slice NS−1 (NS is the total number of slices included in the picture PICT).

Note that in a case that it is not necessary to distinguish each of the slice 0 to the slice NS−1 below, subscripts of reference signs may be omitted. In addition, the same applies to other data with subscripts included in the coding stream Te which will be described below.

Coding Slice

In the coding slice, a set of data referred to by the video decoding apparatus 31 to decode the slice S to be processed is defined. As illustrated in FIG. 4(*c*), the slice includes a slice header and a slice data.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referred to by the video decoding apparatus 31 to decode the slice data to be processed is defined. The slice data includes a CTU as illustrated in FIG. 4(*d*). The CTU is a block of a fixed size (for example, 64×64) constituting a slice, and may be called a Largest Coding Unit (LCU).

Coding Tree Unit

In FIG. 4(*e*), a set of data referred to by the video decoding apparatus 31 to decode the CTU to be processed is defined. The CTU is split into coding unit CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

The CT includes, as CT information, a QT split flag (qt_split_cu_flag) indicating whether or not to perform a QT split, an MT split flag (mtt_split_cu_flag) indicating the presence or absence of an MT split, an MT split direction (mtt_split_cu_vertical_flag) indicating a split direction of an MT split, and an MT split type (mtt_split_cu_binary_flage) indicating a split type of the MT split. The qt_split_cu_flag, mtt_split_cu_flag, mtt_split_cu_vertical_flag, mtt_split_cu_binary_flag is transmitted for each coding node.

Figure 5:
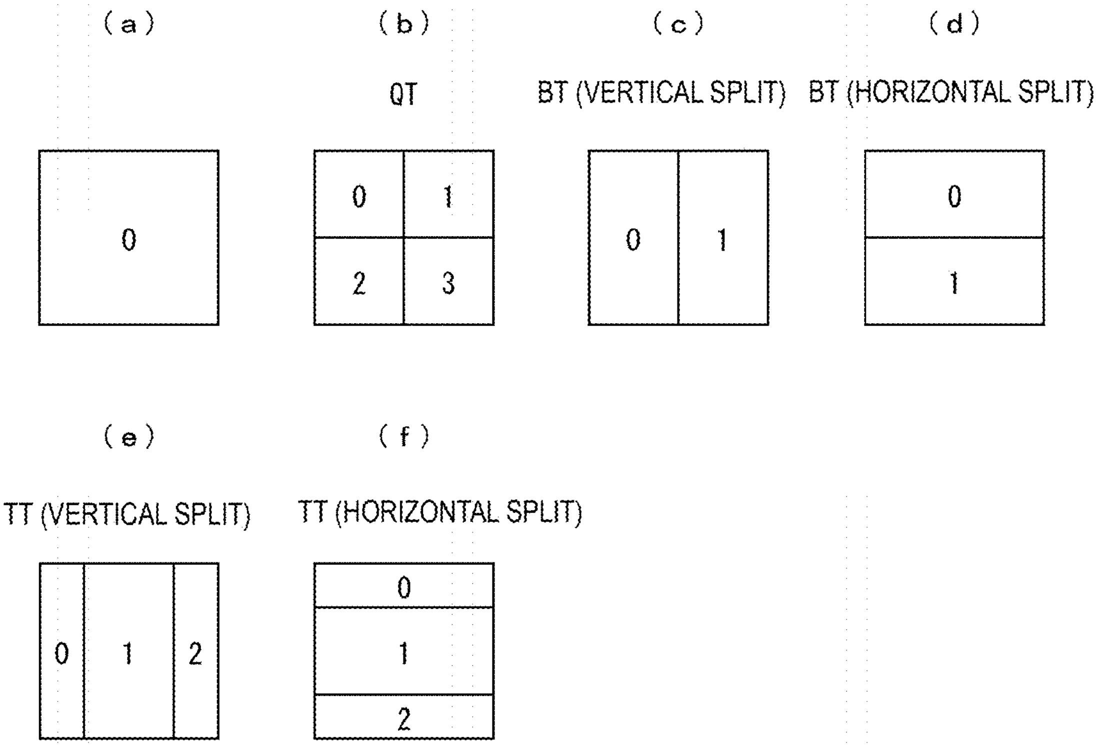
FIG. 5 is a diagram illustrating a split example of a CTU.

FIG. 5 is a diagram illustrating an example of splitting of a CTU. In a case that qt_split_cu_flag is 1, the coding node is split into four coding nodes (FIG. 5(*b*)).

In a case that qt_split_cu_flag is 0, the coding node is not split and has one CU as a node in a case that mtt_split_cu_flag is 0 (FIG. 5(*a*)). The CU is an end node of the coding nodes and is not split any further. The CU is a basic unit of coding processing.

In a case that mtt_split_cu_flag is 1, the coding node is subjected to the MT split as described below. In a case that the mtt_split_cu_vertical_flag is 0 and the mtt_split_cu_binary_flag is 1, the coding node is horizontally split into two coding nodes (FIG. 5(*d*)). In a case that the mtt_split_cu_vertical_flag is 1 and the mtt_split_cu_binary_flag is 1, the coding node is vertically split into two coding nodes (FIG. 5(*c*)). Additionally, in a case that the mtt_split_cu_vertical_flag is 0 and the mtt_split_cu_binary_flag is 0, the coding node is horizontally split into three coding nodes (FIG. 5(*f*)). In a case that the mtt_split_cu_vertical_flag is 1 and the mtt_split_cu_binary_flag is 0, the coding node is vertically split into three coding nodes (FIG. 5(*e*)). These are illustrated in FIG. 5(*g*).

Furthermore, in a case that a size of the CTU is 64×64 pixels, a size of the CU may take any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in FIG. 4(*f*), a set of data referred to by the video decoding apparatus 31 to decode the coding unit to be processed is defined. Specifically, the CU is constituted of a CU header CUH, a prediction parameter, a transform parameter, a quantization transform coefficient, and the like. In the CU header, a prediction mode and the like are defined.

There are cases that the prediction processing is performed in units of CU or performed in units of sub-CU in which the CU is further split. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs which include two horizontal splits and two vertical splits.

There are two types of predictions (prediction modes), which are intra prediction and inter prediction. The intra prediction refers to a prediction in an identical picture, and the inter prediction refers to prediction processing performed between different pictures (for example, between pictures of different display times).

Transform and quantization processing is performed in units of CU, but the quantization transform coefficient may be subjected to entropy coding in units of subblock such as 4×4.

Prediction Parameter

A prediction image is derived by a prediction parameter accompanying a block. The prediction parameter includes prediction parameters of the intra prediction and the inter prediction.

The prediction parameter of the inter prediction will be described below. The inter prediction parameter is constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions “a flag indicating whether or not XX”, a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters include an affine flag affine_flag, a merge flag merge_flag, a merge index merge_idx, an inter prediction indicator inter_pred_idc, a reference picture index refIdxLX, a prediction vector index mvp_LX_idx, a motion vector difference mvdLX, and a motion vector accuracy mode amvr_mode.

Reference Picture List

Figure 6:
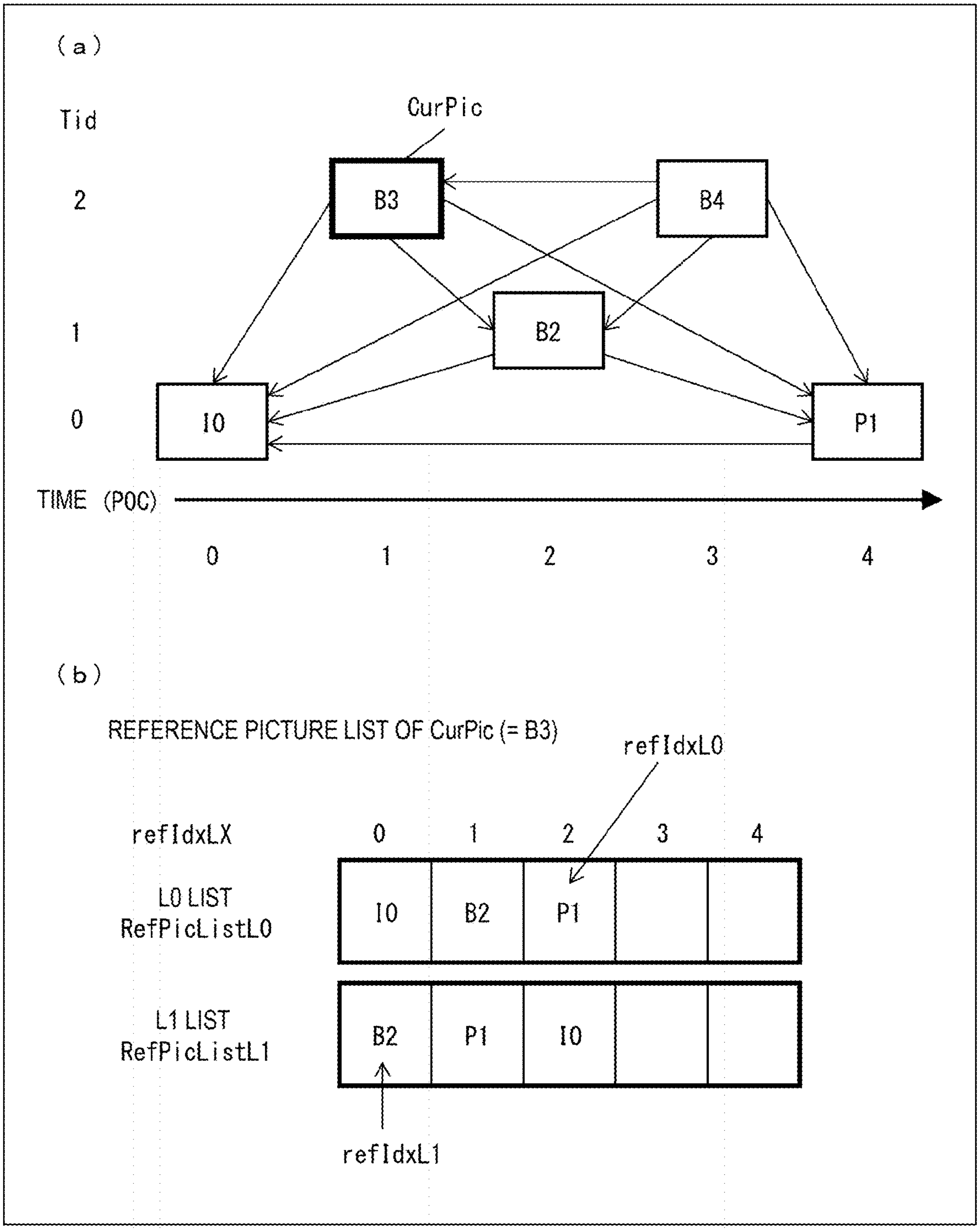
FIG. 6 is a conceptual diagram illustrating an example of reference pictures and reference picture lists.

A reference picture list is a list constituted by reference pictures stored in a reference picture memory 306. FIG. 6 is a conceptual diagram illustrating an example of reference pictures and reference picture lists. In FIG. 6(*a*), a rectangle indicates a picture, an arrow indicates a reference relationship of a picture, a horizontal axis indicates time, each of I, P, and B in a rectangle indicates an intra-picture, a uni-prediction picture, a bi-prediction picture, and a number in a rectangle indicates a decoding order. As illustrated, the decoding order of the pictures is I0, P1, B2, B3, and B4, and the display order is I0, B3, B2, B4, and P1. FIG. 6(*b*) illustrates an example of reference picture lists of the picture B3 (target picture). The reference picture list is a list to represent a candidate of a reference picture, and one picture (slice) may include one or more reference picture lists. In the illustrated example, the target picture B3 includes two reference picture lists, i.e., an L0 list RefPicList0 and an L1 list RefPicList1. For an individual CU, which picture in a reference picture list RefPicListX (X=0 or 1) is actually referred to is specified with the reference picture index refIdxLX. The diagram illustrates an example of refIdxL0=2, refIdxL1=0. Note that LX is a description method used in a case of not distinguishing an L0 prediction and an L1 prediction, and in the following description, distinguishes parameters for the L0 list and parameters for the L1 list by replacing LX with L0 and L1.

Merge Prediction and AMVP Prediction

A decoding (coding) method for prediction parameters include a merge prediction (merge) mode and an Advanced Motion Vector Prediction (AMVP) mode, and the merge flag merge_flag is a flag to identify the modes. The merge prediction mode is a mode to use to derive from prediction parameters of neighboring blocks already processed without including a prediction list utilization flag predFlagLX (or inter prediction indicator inter_pred_idc), the reference picture index refIdxLX, and a motion vector mvLX in coded data. The AMVP mode is a mode in which the inter prediction indicator inter_pred_idc, the reference picture index refIdxLX, and the motion vector mvLX are included in coded data. Note that, the motion vector mvLX is coded as the prediction vector index mvp_LX_idx identifying a prediction vector mvpLX, the motion vector difference mvdLX, and the motion vector accuracy mode amvr_mode. The merge prediction mode is a mode in which a merge candidate derived from motion information and the like of the adjacent block is selected to obtain a motion vector mvLX (motion vector information). Furthermore, in addition to the merge prediction mode, an affine prediction mode identified by an affine flag affine_flag may be provided. As one form of the merge prediction mode, a skip mode identified by the skip flag skip_flag may be provided. Note that the skip mode is a mode in which the prediction parameter is derived and used as is the case with the merge mode and in which the prediction error (residual image, residual information) is not included in the coded data. In other words, in a case that skip flag skip_flag is 1, for the target CU, the coded data includes only the syntax associated with the merge mode such as the skip flag skip_flag and the merge index merge_idx, and no motion vectors, residual information, or the like.

Motion Vector

The motion vector mvLX indicates a shift amount between blocks in two different pictures. A prediction vector and a motion vector difference related to the motion vector mvLX is referred to as a prediction vector mvpLX and a motion vector difference mvdLX respectively.

Inter Prediction Indicator inter_pred_idc and Prediction List Utilization Flag predFlagLX The inter prediction indicator inter_pred_idc is a value indicating types and the number of reference pictures, and takes any value of PRED_L0, PRED_L1, and PRED_BI. PRED_L0 and PRED_L1 indicate uni-predictions which use one reference picture managed in the L0 list and one reference picture managed in the L1 list, respectively. PRED_BI indicates a bi-prediction BiPred which uses two reference pictures managed in the L0 list and the L1 list.

The merge index merge_idx is an index to indicate which prediction parameter is used as a prediction parameter of a target block among prediction parameter candidates (merge candidates) derived from blocks of which the processing is completed.

A relationship between the inter prediction indicator inter_pred_idc and prediction list utilization flags predFlagL0 and predFlagL1 are as follows, and those can be converted mutually.

$$inter\_pred\_idc=(predFlagL1<<1)+predFlagL0$$

$$predFlagL0=inter\_pred\_idc \,\&1$$

$$predFlagL1=inter\_pred\_idc>>1$$

Determination of Bi-Prediction biPred

A flag biPred of whether or not to be the bi-prediction BiPred can be derived from whether or not two prediction list utilization flags are both 1. For example, the derivation can be performed by the following equation.

$$biPred=(predFlagL0==1 \&\& predFlagL1==1)$$

Alternatively, the flag biPred can be also derived from whether the inter prediction indicator is a value indicating to use two prediction lists (reference pictures). For example, the derivation can be performed by the following equation.

$$biPred=(inter\_pred\_idc==PRED\_BI)?1:0$$

Configuration of Video Decoding Apparatus

Figure 7:
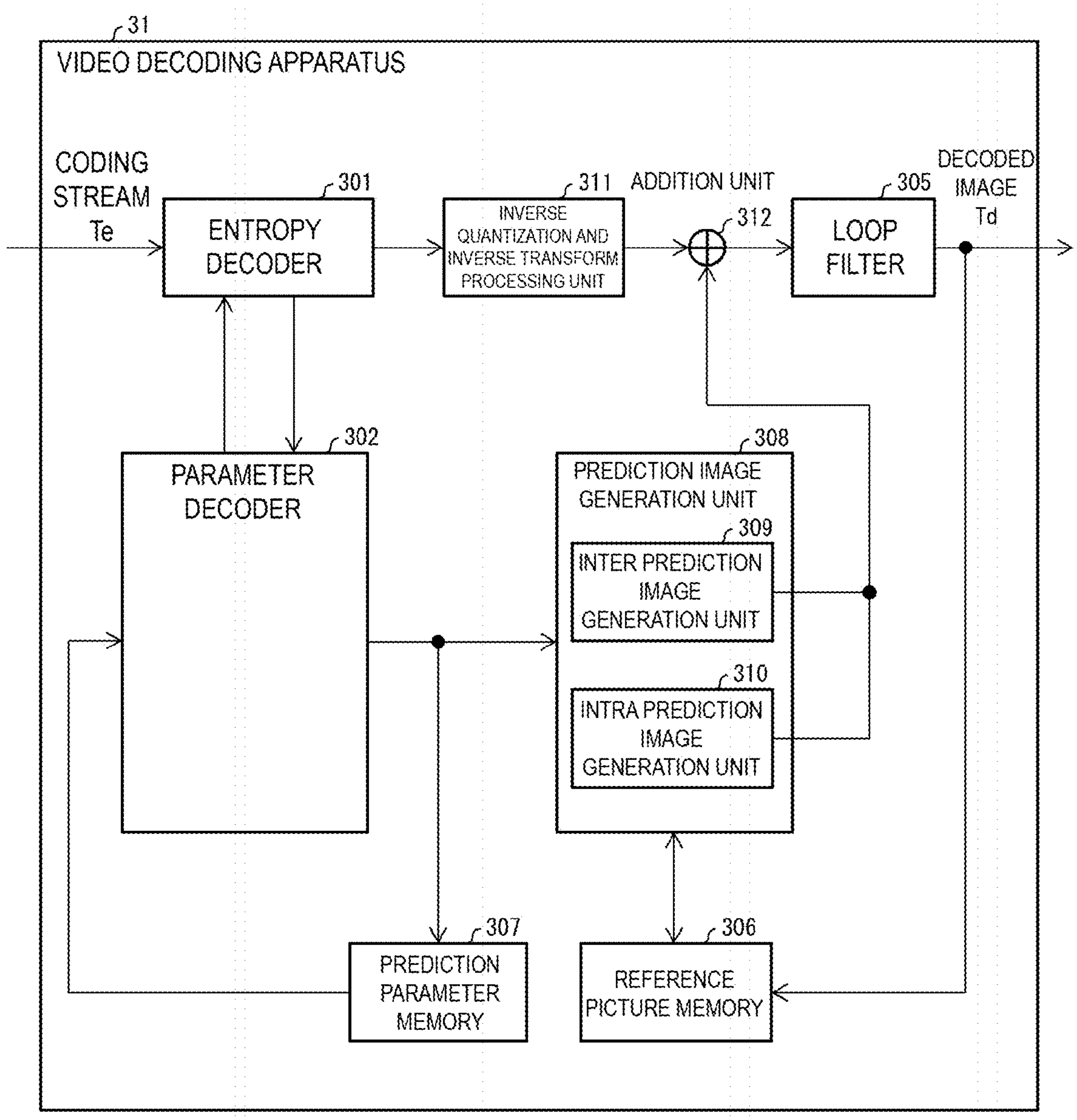
FIG. 7 is a schematic diagram illustrating a configuration of a video decoding apparatus.

The configuration of the video decoding apparatus 31 (FIG. 7) according to the present embodiment will be described.

The video decoding apparatus 31 includes an entropy decoder 301, a parameter decoder 302, a loop filter 305, the reference picture memory 306, a prediction parameter memory 307, a prediction image generation unit (prediction image generation apparatus) 308, an inverse quantization and inverse transform processing unit 311, and an addition unit 312. Note that a configuration in which the loop filter 305 is not included in the video decoding apparatus 31 may be used in accordance with the video coding apparatus 11 described later.

The parameter decoder 302 further includes a header decoder 3020, a CT information decoder 3021, and a CU decoder 3022 (prediction mode decoder), which are not illustrated, and the CU decoder 3022 further includes a TU decoder 3024. These may be collectively referred to as a decoding module. The header decoder 3020 decodes, from coded data, parameter set information such as the VPS, the SPS, and the PPS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and quantization prediction error (residual_coding) from coded data.

In the mode other than the skip mode (skip_mode==0), the TU decoder 3024 decodes QP update information (quantization correction value) and quantization prediction error (residual_coding) from coded data. More specifically, the TU decoder 3024 decodes, in a case of skip_mode==0, a flag cu_cbp indicating whether a quantization prediction error is included in the target block is decoded from the coded data, and decodes the quantization prediction error in a case that cu_cbp is 1. In a case that cu_cbp is not present in the coded data, the TU decoder 3024 derives cu_cbp as 0.

In addition, the parameter decoder 302 includes an inter prediction parameter decoder 303 and an intra prediction parameter decoder 304 which are not illustrated. The prediction image generation unit 308 includes an inter prediction image generation unit 309 and an intra prediction image generation unit 310.

Furthermore, an example in which a CTU and a CU are used as units of processing is described below, but the processing is not limited to this example, and processing in units of sub-CU may be performed. Alternatively, the CTU and the CU may be replaced with a block, the sub-CU may be replaced with by a subblock, and processing may be performed in units of blocks or subblocks.

The entropy decoder 301 performs entropy decoding on the coding stream Te input from the outside and separates and decodes individual codes (syntax elements). The separated codes include prediction information to generate a prediction image, a prediction error to generate a difference image, and the like.

The entropy decoder 301 outputs the decoded codes to the parameter decoder 302. The decoded code is, for example, predMode, merge_flag, merge_idx, inter_pred_idc, refIdxLX, mVP_Lx_idx, mvdLX, amvr_mode, and the like. Which code is to be decoded is controlled based on an indication of the parameter decoder 302.

Configuration of Inter Prediction Parameter Decoder

The inter prediction parameter decoder 303 decodes an inter prediction parameter with reference to a prediction parameter stored in the prediction parameter memory 307, based on a code input from the entropy decoder 301. Furthermore, the inter prediction parameter decoder 303 outputs the decoded inter prediction parameter to the prediction image generation unit 308, and stores the decoded inter prediction parameter in the prediction parameter memory 307.

Figure 8:
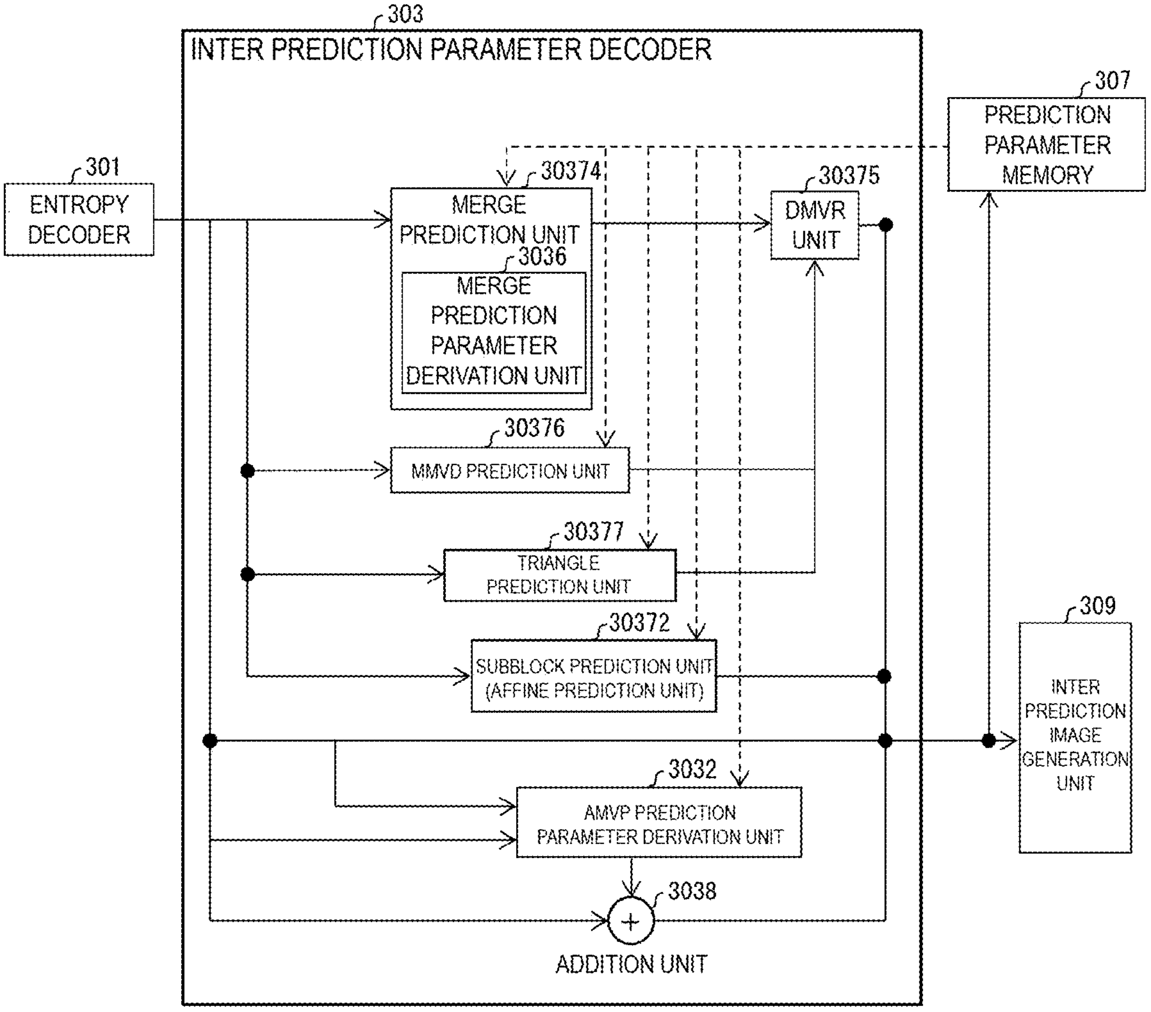
FIG. 8 is a schematic diagram illustrating a configuration of an inter prediction parameter decoder.

FIG. 8 is a schematic diagram illustrating a configuration of the inter prediction parameter decoder 303 according to the present embodiment. The inter prediction parameter decoder 303 includes a merge prediction unit 30374, a DMVR unit 30375, a subblock prediction unit (affine prediction unit) 30372, an MMVD prediction unit 30376, a Triangle prediction unit 30377, an AMVP prediction parameter derivation unit 3032, and an addition unit 3038. The merge prediction unit 30374 includes a merge prediction parameter derivation unit 3036. The AMVP prediction parameter derivation unit 3032, the merge prediction parameter derivation unit 3036, and the affine prediction unit 30372 are means shared by the video coding apparatus and the video decoding apparatus, and may thus be collectively referred to as a motion vector derivation unit (motion vector derivation apparatus).

Affine Prediction Unit

The affine prediction unit 30372 derives an affine prediction parameter of a target block. In the present embodiment, as the affine prediction parameter, motion vectors (mv0_x, mv0_y) and (mv1_x, mv1_y) of the two control points (V0, V1) of the target block are derived. Specifically, the motion vector of each control point may be derived by prediction from a motion vector of an adjacent block of the target block, or the motion vector of each control point may be derived by the sum of the prediction vector derived as the motion vector of the control point and the motion vector difference derived from coded data.

Figure 10:
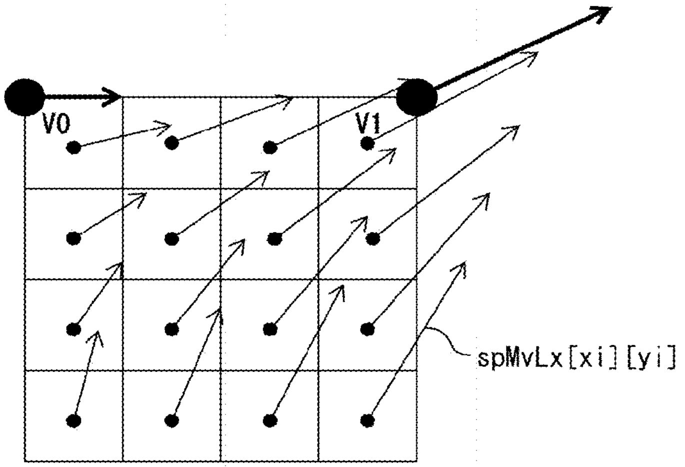
FIG. 10 is a diagram illustrating a motion vector spMvLX [xi][yi] of an affine prediction.

FIG. 10 is a diagram illustrating an example in which a motion vector spMvLX of each subblock constituting the target block (bW×bH) is derived from a motion vector (mv0_x, mv0_y) of the control point V0 and a motion vector (mv1_x, mv1_y) of the control point V1. The motion vector spMvLX of each subblock is derived as a motion vector for each point located at the center of each subblock, as illustrated.

Based on the affine prediction parameter of the target block, the affine prediction unit 30372 derives a motion vector spMvLX[xi] [yi] of each subblock in the target block (xi=xPb+sbW*i, yj=yPb+sbH*j, i=0, 1, 2, . . . , bW/sbW−1, j=0, 1, 2, . . . , bH/sbH−1) using the following formula:

$$spMvLX[xi][yi][0]=mv0\_x+(mv1\_x-mv0\_x)/bW*(xi+sbW/2)-(mv1\_y-mv0\_y)/bH*(yi+sbH/2)$$

$$spMvLX[xi][yi][1]=mv0\_y+(mv1\_y-mv0\_y)/bW*(xi+sbW/2)+(mv1\_x-mv0\_x)/bH*(yi+sbH/2)$$

Merge Prediction

Figure 9:
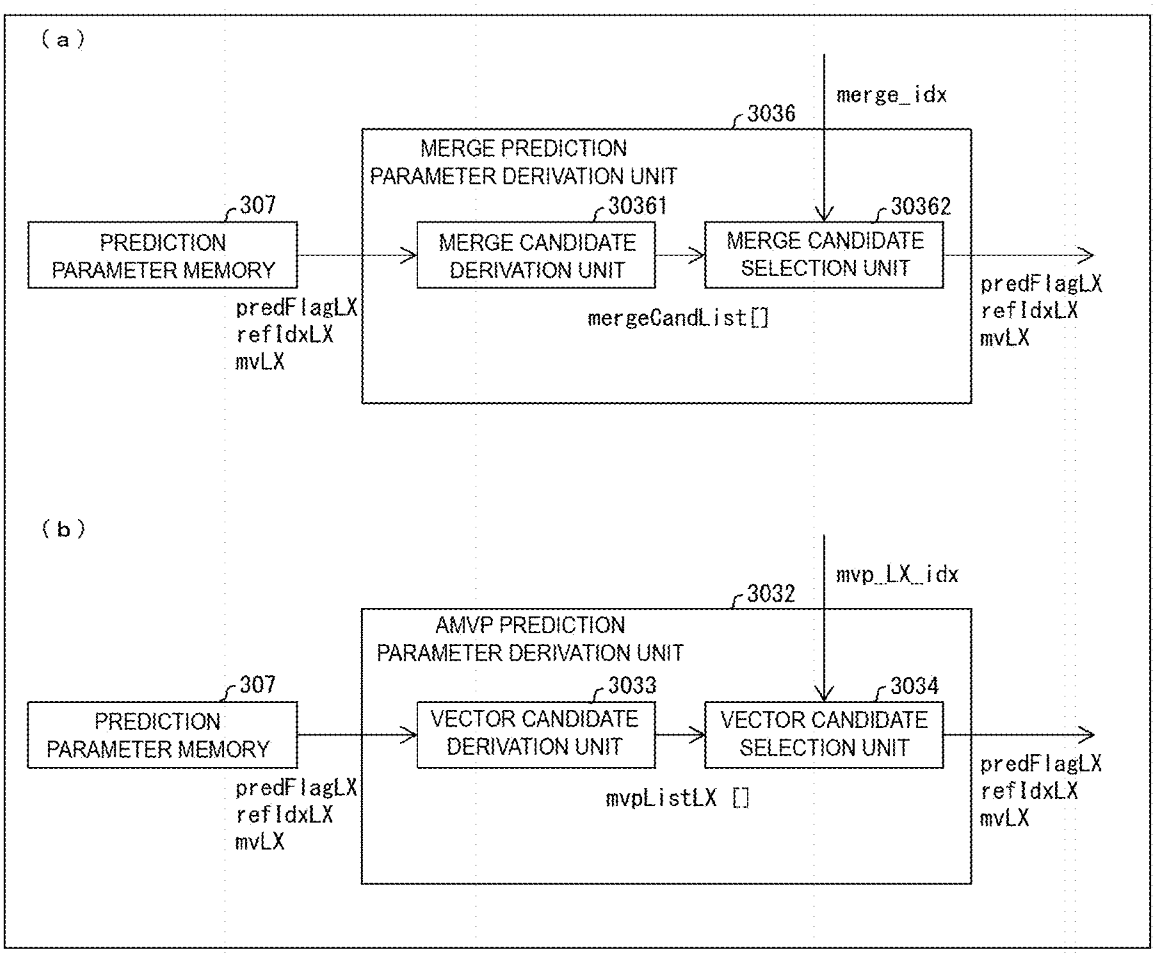
FIG. 9 is a schematic diagram illustrating configurations of a merge prediction parameter derivation unit and an AMVP prediction parameter derivation unit.

FIG. 9(*a*) is a schematic diagram illustrating a configuration of the merge prediction parameter derivation unit 3036 included in the merge prediction unit 30374. The merge prediction parameter derivation unit 3036 includes a merge candidate derivation unit 30361 and a merge candidate selection unit 30362. Note that the merge candidates include the prediction list utilization flag predFlagLX, the motion vector mvLX, and the reference picture index refIdxLX, and is stored in the merge candidate list. The merge candidate stored in the merge candidate list is assigned an index in accordance with a prescribed rule.

The merge candidate derivation unit 30361 derives the merge candidate using a motion vector of a decoded adjacent block and the reference picture index refIdxLX as is.

The order of storing in the merge candidate list mergeCandList[ ] is, for example, spatial merge candidates A1, B1, B0, A0, B2, a temporal merge candidate Col, a pair-wise merge candidate avgK, and a zero merge candidate ZK. Note that a reference block that is not available (intra prediction block, or the like) is not stored in the merge candidate list.

The merge candidate selection unit 30362 selects a merge candidate N indicated by a merge index merge_idx from the merge candidates included in the merge candidate list, in accordance with the equation below.

$$N=mergeCandList[merge\_idx]$$

Here, N is a label indicating a merge candidate, and takes A1, B1, B0, A0, B2, Col, avgK, ZK, and the like. The motion information of the merge candidate indicated by the label N is indicated by (mvLXN [0], mvLXN [1]), predFlagLXN, refIdxLXN.

The merge candidate selection unit 30362 selects the motion information (mvLXN [0], mvLXN [1]), predFlagLXN, and refIdxLXN of the selected merge candidate as inter prediction parameters of the target block. The merge candidate selection unit 30362 stores the inter prediction parameters for the selected merge candidate in the prediction parameter memory 307 and outputs the inter prediction parameters to the prediction image generation unit 308.

AMVP Prediction

FIG. 9(*b*) is a schematic diagram illustrating the configuration of the AMVP prediction parameter derivation unit 3032 according to the present embodiment. The AMVP prediction parameter derivation unit 3032 includes a vector candidate derivation unit 3033 and a vector candidate selection unit 3034. The vector candidate derivation unit 3033 derives a prediction vector candidate from a motion vector mvLX of a decoded adjacent block stored in the prediction parameter memory 307 based on the reference picture index refIdxLX, and stores the result in a prediction vector candidate list mvpListLX[ ].

The vector candidate selection unit 3034 selects, among the prediction vector candidates of the prediction vector candidate list mvpListLX[ ], a motion vector mvpListLX [mvp_LX_idx] indicated by the prediction vector index mvp_LX_idx, as a prediction vector mvpLX. The vector candidate selection unit 3034 outputs the selected prediction vector mvpLX to the addition unit 3038.

Note that the prediction vector candidate is derived by scaling a motion vector of a decoded neighboring block in a predetermined range from the target block. Note that the neighboring blocks include blocks that are spatially adjacent to the target block, such as a left block and an upper block, for example, and also regions temporally adjacent to the target block, e.g., regions obtained from prediction parameters for blocks including the same location as that of the target block but different display times.

The addition unit 3038 adds the prediction vector mvpLX input from the AMVP prediction parameter derivation unit 3032 and the decoded motion vector difference mvdLX, and calculates the motion vector mvLX. The addition unit 3038 outputs the calculated motion vector mvLX to the prediction image generation unit 308 and the prediction parameter memory 307.

$$mvLX[0]=mvpLX[0]+mvdLX[0]$$

$$mvLX[1]=mvpLX[1]+mvdLX[1]$$

The motion vector accuracy mode amvr_mode is a syntax that switches the accuracy of the motion vector derived in the AMVP mode, and, for example, switches between ¼, 1, and 4 pixel accuracy in the amvr_mode=0, 1, 2.

In a case where the accuracy of motion vectors is 1/16 (MVPREC=16), inverse quantization may be performed by using MvShift (=1<<amvr_mode) derived from the amvr_mode as described below, in order to change the motion vector difference with a ¼, 1, or 4 pixel accuracy to a motion vector difference with a 1/16 pixel accuracy.

$$mvdLX[0]=mvdLX[0]<<(MvShift+2)$$

$$mvdLX[1]=mvdLX[1]<<(MvShift+2)$$

Furthermore, the parameter decoder 302 may decode and derive mvdLX[ ] not subjected yet to shifting by MvShift described above, by decoding the syntax below.

abs_mvd_greater0_flag abs_mvd_minus2 mvd_sign_flag

Then, the parameter decoder 302 decodes the motion vector difference 1Mvd[ ] from the syntax by using the equation below.

$$1Mvd[compIdx]=abs\_mvd\_greater0\_flag[compIdx]*(abs\_mvd\_minus2[compIdx]+2)*(1-2*mvd\_sign\_flag[compIdx]$$

The further decoded motion vector difference 1Mvd [ ] is configured to MvdLX for a translation MVD (MotionModelIdc[x][y]==0) and configured to MvdCpLX for a control point MVD (MotionModelIdc[x][y]!=0).

if (MotionModelIdc[x][y]==0)

mvdLX[x0][y0][compIdx]=1Mvd[compIdx]

else mvdCpLX[x0][y0][compIdx]=1Mvd[compIdx]<<2

Motion Vector Scaling

A derivation method for the scaling of a motion vector will be described. Assuming that a motion vector is Mv (reference motion vector), a picture including a block with an Mv is PicMv, a reference picture for the Mv is PicMvRef, a motion vector subjected to scaling is sMv, a picture including a block with an sMv is CurPic, a reference picture referenced by sMv is CurPicRef, a derivation function MvScale (Mv, PicMv, PicMvRef, CurPic, CurPicRef) for the sMv is represented by the following equation.

$$sMv = \text{MvScale}(Mv, \text{PicMv}, \text{PicMvRef}, \text{CurPic}, \text{CurPicRef}) =$$
$$\text{Clip3}(-R1, R1 - 1, \text{sign}(\text{distScaleFactor}) * Mv) *$$
$$((\text{abs}(\text{distScaleFactor} * Mv) + \text{round1} - 1) \gg \text{shift1}))$$
$$\text{distScaleFactor} = \text{Clip3}(-R2, R2 - 1, (tb * tx + \text{round2}) \gg \text{shift2})$$
$$tx = (16384 + \text{abs}(td) \gg 1)/td$$
$$td = \text{DiffPicOrderCnt}(\text{PicMv}, \text{PicMvRef})$$
$$tb = \text{DiffPicOrderCnt}(\text{CurPic}, \text{CurPicRef})$$

Here, the round1, round2, shift1, and shift2 are round values and shift values for division using reciprocal, such as, for example, round1=1<<(shift1−1), round2=1<<(shift2−1), shift1=8, shift2=6, etc. DiffPicOrderCnt (Pic1, Pic2) is a function that returns the difference in time information (e.g., POC) between Pic1 and Pic2. For example, R1 and R2 are used to limit the range of values for performing the processing with limited accuracy, and, for example, R1=32768, R2=4096, and the like.

Additionally, the scaling function MvScale (Mv, PicMv, PicMvRef, CurPic, CurPicRef) may be expressed by the equation below.

$$\text{MvScale}(Mv, \text{PicMv}, \text{PicMvRef}, \text{CurPic}, \text{CurPicRef})$$
$$= MV * \text{DiffPicOrderCnt} (\text{CurPic}, \text{CurPicRef})/\text{DiffPicOrderCnt}(\text{PicMv}, \text{PicMvRef})$$

That is, the Mv may be scaled according to the ratio between the difference in time information between CurPic and CurPicRef and the difference in time information between PicMv and PicMvRef.

DMVR

Now, a DECODER UNIT side Motion Vector Refinement (DMVR) processing performed by the DMVR unit 30375 will be described. In a case that the following conditions are satisfied for a target CU, the DMVR unit 30375 modifies the motion vector mvLX of the target CU derived by the merge prediction unit 30374, by using the reference image.

merge_flag indicates that the merge mode is applied to the target CU, or skip_flag indicates that the skip mode is applied to the target CU.

affine_flag indicates that the affine mode is not used for the target CU.

the target CU corresponds to a bi-prediction.

the following equation is satisfied for the reference picture (two reference pictures are located in opposite directions with respect to the target picture and at the same POC distance (POC difference) from the target picture).

POC_current−POC0=POC1−POC_current the size of the target CU is larger than a prescribed value. For example, the sum of the width and height of the CU is greater than 12.

The DMVR processing includes the following steps:

Step 0: Obtain an initial vector indicated by the merge index. At this time, the value of the motion vector is rounded to the nearest integer vector as an initial integer vector.

Step 1: The average value of the pixel values of the blocks of the search point is determined.

Step 2: An MRSAD cost is calculated for the point indicated by the motion vector (initial vector) of the merge candidate and four points neighboring the indicated point, and the point with the cost minimized is determined.

Step 3: An MRSAD cost is calculated for the point with the cost minimized in step 2 and eight points neighboring the point with the cost minimized is calculated, the point with the cost minimized is determined, and the initial vector (vector not rounded to an integer yet) is modified by an amount corresponding to integer pixels of the point with the cost minimized, to obtain a refinement motion vector.

Step 4: In a case that the motion vector is not changed from the initial integer vector in steps 2 and 3, an error surface equation is used to obtain a refinement motion vector with a fractional accuracy.

Step 5: Based on the refinement motion vector, a final prediction image is acquired using an 8-tap interpolation filter.

In steps 2 and 3, the MRSAD cost is calculated by the equation below.

$$\text{MRSAD} = \Sigma\Sigma \text{abs}(\text{Temp\_L0}[xi][yi] - \text{Temp\_L1}[xi][yi] - \text{AVE}(\text{Temp\_L0}) + \text{Ave}(\text{Temp\_L1}))$$

Here, AVE is the average value of the pixel values in the block. In other words, AVE(Temp_L0)=ΣΣTemp_L0[xi][yi]/(BH*BW)Ave (Temp_L1)=ΣΣTemp_L1[xi][yi]/(BH*BW). BH is the number of pixels in the vertical direction of the block, and BW is the number of pixels in the horizontal direction of the block.

In step 4, the error surface equation is as follows.

$$E(x,y) = A(x-x0)^2 + B(y-y0)^2 + C$$

Here, the cost of the four neighboring locations (−1, 0), (0, −1), (1, 0), and (0, 1) around the point indicated by the initial vector and used as the center (0, 0) is defined as E(−1, 0), E(0, −1), E(1, 0), and E(0, 1), and (x0, y0) is derived.

$$x0 = (E(-1,0) - E(1,0))/(2(E(-1,0) + E(1,0) - 2E(0,0)))$$

$$y0 = (E(0,-1) - E(0,1))/(2(E(0,-1) + E(0,1) - 2E(0,0)))$$

Refinement motion vectors mvL0', mvL1' and pre-refinement motion vectors mvL0, mvL1 satisfy the equation below:

$$mvL0' - mvL0 = mvL1 - mvL1'$$

The refinement motion vector mvLX is supplied to the inter prediction image generation unit 309.

The refinement motion vector mvLX may be used for a deblocking operation and a temporal motion vector prediction.

Additionally, refinement motion vectors mvLX from the upper and upper left CTUs are used for spatial motion vector prediction. However, in a case that the motion vector of the merge candidate is not from the upper and upper left CTUs, a motion vector that has not been refined is used.

The technique has been illustrated in which the MRSAD is used as an error evaluation value. However, an SAD value SAD=ΣΣabs(Temp_L0[xi][yi]−Temp_L1[xi][yi]) corresponding to an absolute value difference sum may be used. In this case, processing for determining the average value of the block in step 1 is not necessary.

Triangle Prediction

The Triangle prediction will now be described. In Triangle prediction, the target CU is split into two triangular prediction units by using a diagonal line or an opposite diagonal line as a boundary. The prediction image in each triangle prediction unit is derived by performing weighting mask processing on each pixel of the prediction image of the target CU (the rectangular block including the triangular prediction unit) depending on the position of the pixel. For example, a triangle image can be derived from a rectangular image by multiplication by masking in which the pixels of the triangular region included in the rectangular region are 1, whereas the pixels of the portions of the rectangular region other than the portion corresponding to the triangular region are 0. The adaptive weighting processing of the prediction image is applied to both regions across the diagonal line, and one prediction image of the target CU (rectangular block) is derived by adaptive weighting processing using two prediction images. This processing is referred to as Triangle combining processing. In the Triangle combining processing, transform (inverse transform) and quantization (inverse quantization) processing is applied to the entire target CU. Note that the Triangle prediction is applied only in a case of the merge prediction mode or the skip mode.

The Triangle prediction unit 30377 derives the prediction parameters corresponding to the two triangular regions used for the Triangle prediction, and supplies the predicted prediction parameters to the inter prediction image generation unit 309. The Triangle prediction may be configured not to use bi-prediction for simplification of processing. In this case, an inter prediction parameter for a uni-prediction is derived in one triangular region. Note that the motion compensation unit 3091 and the Triangle combining unit 30952 derive two prediction images and perform composition by using the prediction images.

MMVD Prediction Unit 30376

The MMVD prediction unit 30376 performs processing in Merge with Motion Vector Difference (MMVD) mode. The MMVD mode is a mode in which a motion vector is obtained by adding a motion vector difference at a prescribed distance and in a prescribed direction to a motion vector derived from the merge candidate (a motion vector derived from the motion vector of a neighboring block or the like). In the MMVD mode, the MMVD prediction unit 30376 efficiently derives a motion vector by using the merge candidate and limiting the value range of the motion vector difference to prescribed distances (e.g., eight distances) and prescribed directions (e.g., four directions, eight directions, or the like).

The MMVD prediction unit 30376 derives the motion vector mvLX[ ] by using the merge candidate mergeCandList[ ] and syntaxes base_candidate_idx, direction_idx, and distance_idx that are decoded from coded data or that are coded into coded data. Furthermore, the MMVD prediction unit 30376 may code or decode a syntax distance_list_idx for selecting a distance table for use.

The MMVD prediction unit 30376 decodes the MMVD flag in a case that merge_flag indicates that the merge mode is applied or skip_flag indicates that a skip mode is applied, to the target CU. Furthermore, in a case that the MMVD flag indicates that the MMVD mode is applied (mmvd_flag=1), the MMVD prediction unit 30376 applies the MMVD mode.

The MMVD prediction unit 30376 derives the motion vector by using the prediction vector of any one of two leading candidates in the merge candidate list and a motion vector difference (MVD) expressed by the direction and the distance. Furthermore, the MMVD prediction unit 30376 derives the motion vector from the prediction vector and the motion vector difference.

Figure 15:
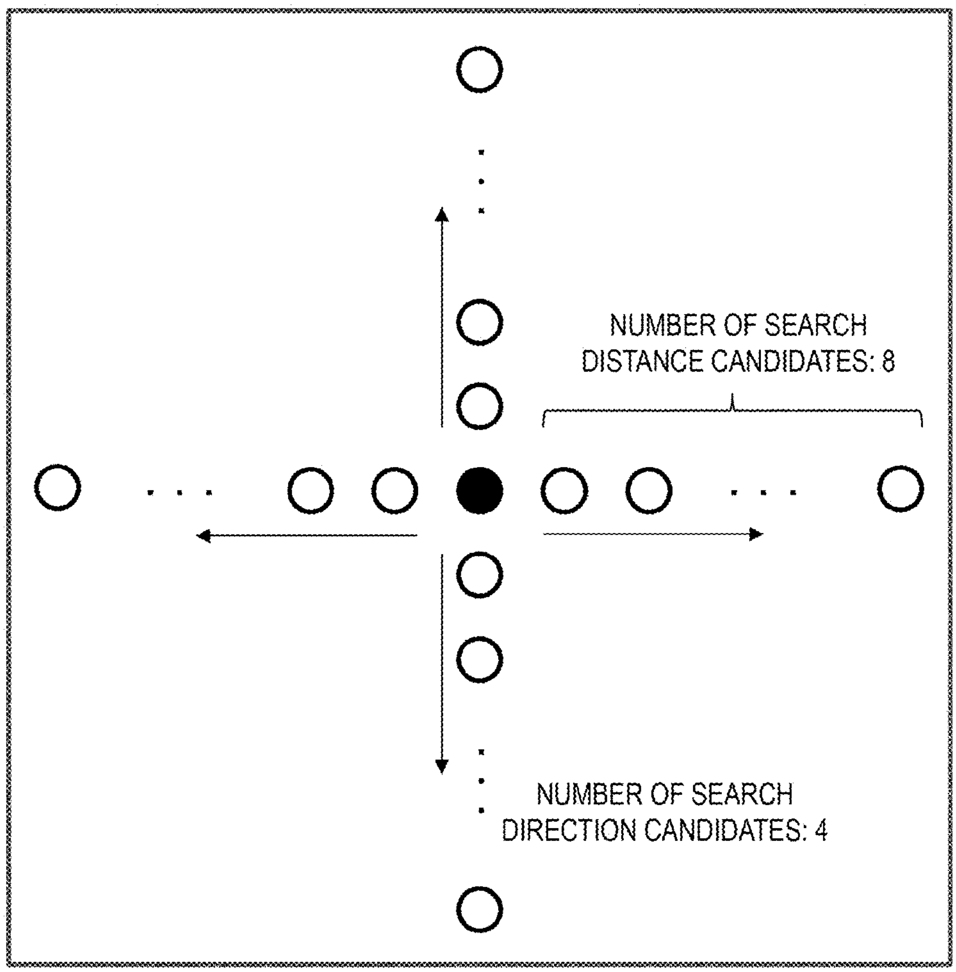
FIG. 15 is a diagram illustrating an example of the number of candidates for a search distance and the number of candidates for a derivation direction in the video coding apparatus.

FIG. 15 illustrates a candidate for the motion vector difference mvdLX derived in the MMVD prediction unit 30376. In the example illustrated in the figure, a central solid circle is a location indicated by the prediction vector mvLXN (central vector).

Figure 14:
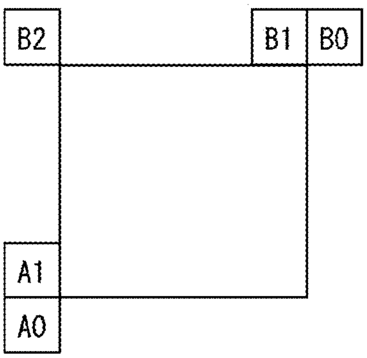
FIG. 14 is a diagram illustrating an example of an index used in an MMVD mode, where (a) thereof is a diagram illustrating an example of an index base_candidate_idx indicating a merge candidate in a merge candidate list mergeCandList[ ], (b) thereof is a diagram illustrating an example of a block adjacent to a target block, (c) thereof is a diagram illustrating an example of distance_idx, and (d) thereof is a diagram illustrating an example of direction_idx.

FIG. 14(*a*) illustrates a relationship between the index base_candidate_idx of mergeCandList[ ] and mvLXN, and mvLXN is set equal to the motion vector of mergeCandList[base_candidate_idx]. The difference between the location (solid circle in FIG. 15) and the actual motion vector indicated by the central vector is the motion vector difference mvdLX.

FIG. 14(*b*) is a diagram illustrating an example of a block adjacent to the target block. For example, for mergeCandList[ ]={A1, B1, B0, A0, B2}, in a case that base_candidate_idx decoded indicates 0, the MMVD prediction unit 30376 selects the motion vector of the block A1 illustrated in FIG. 14(*b*) as the prediction vector mvLXN. In a case that base_candidate_idx decoded indicates 1, the MMVD prediction unit 30376 selects the motion vector of a block B1 illustrated in FIG. 14(*b*) as the prediction vector mvLXN. Note that, in a case that base_candidate_idx is not signalled in the coded data, base_candidate_idx=0 may be estimated.

Additionally, the MMVD prediction unit 30376 derives mvdLX by using the index distance_idx indicating the length of the motion vector difference mvdLX and the index direction_idx indicating the directions of mvdLX.

FIG. 14(*c*) is a diagram illustrating an example of distance_idx. As illustrated in FIG. 14(*c*), the values of 0, 1, 2, 3, 4, 5, 6, and 7 in distance_idx are respectively associated with each of the eight distances (lengths) of ¼ pel, ½ pel, 1 pel, 2 pel, 4 pel, 8 pel, 16 pel, and 32 pel.

FIG. 14(*d*) is a diagram illustrating an example of direction_idx. As illustrated in FIG. 14(*d*), the values of 0, 1, 2, and 3 in direction_idx are respectively associated with the direction of the positive x axis, the direction of the negative x axis, the direction of the positive y axis, and the direction of the negative y axis. The MMVD prediction unit 30376 derives a base motion vector (mvdUnit[0], mvdUnit[1]) from direction_idx with reference to a direction table DirectionTable. (mvdUnit[0], mvdUnit[1]) may also be described as (sign[0], sign[1]). Additionally, the MMVD prediction unit 30376 derives the magnitude DistFromBaseMV of a motion vector difference used as a base, from the distance DistanceTable[distance_idx] indicated by distance_idx in the distance table DistanceTable, by using the equation below.

DistFromBaseMV=DistanceTable[distance_idx]

Other than Four Directions

In the above description, a case has been described in which the base motion vector (mvdUnit[0], mvdUnit[1]) is present in four directions including upward, downward, leftward, and rightward directions. However, the present embodiment is not limited to the four directions but may be eight directions. Examples of an x component dir_table_x[ ] and a y component dir_table_y[ ] of the direction table DirectionTable in which the base motion vector is present in eight directions are illustrated below.

dir_table_*x*[ ]={8,−8,0,0,6,−6,−6,6} dir_table_*y*[ ]={0,0,8,−8,6,−6,6,−6}

Note that the size of the direction table and the order of elements in the direction table may be other than those described above.

The MMVD prediction unit 30376 derives a base motion vector (mvdUnit [0], mvdUnit [1]) with reference to DirectionTable based on direction_idx.

mvdUnit[0]=dir_table_*x*[direction_idx]

mvdUnit[1]=dir_table_*y*[direction_idx]

Additionally, four, six, twelve, or sixteen directions may be used, for example, by using a direction table as described below.

Case of six directions dir_table_x[ ]={8, −8, 2, −2, 2} dir_table_y[ ]={0, 0, 4, −4, 4, −4} or dir_table_x[ ]={8, −8, 3, −3, −3, 3} dir_table_y[ ]={0, 0, 6, −6, 6, −6}

Case of twelve directions dir_table_x [ ]={8, −8, 0, 0, 4, 2, −4, −2, −2, −4, 2, 4} dir_table_y [ ]={0, 0, 8, −8, 2, 4, −2, −4, 4, 2, −4, −2} or dir_table_x [ ]={8, −8, 0, 0, 6, 3, −6, −3, −3, −6, 3, 6} dir_table_y [ ]={0, 0, 8, −8, 3, 6, −3, −6, 6, 3, −6, −3}

Case of sixteen directions dir_table_x[ ]={8, −8, 0, 0, 4, −4, −4, 4, 6, 2, −6, −2, −2, −6, 2, 6} dir_table_y[ ]={0, 0, 8, −8, 4, −4, 4, −4, 2, 6, −2, −6, 6, 2, −6, −2}

Of course, in a case of four directions, the following is true:

dir_table_x[ ]={1, −1, 0, 0} dir_table_y[ ]={0, 0, 1, −1}

Note that the size of the direction table and the order of elements in the direction table may be other than those described above.

Multiple Distance Tables

In addition, the number of distance tables is not limited to one, and multiple distance tables may be provided. For example, the MMVD prediction unit 30376 may derive DistFromBaseMV from a first distance table DistanceTable1[ ] and a second distance table DistanceTable2[ ] as follows.

The MMVD prediction unit 30376 further uses DistanceTable[ ] indicated by distance_list_idx decoded or derived from the coded data to derive the length of the motion vector difference mvdLX.

DistanceTable1[ ]={1, 2, 3, 5}

DistanceTable2[ ]={4, 8, 16, 32}

DistanceTable=DistanceTable1 (distance_list_idx==0)

DistanceTable=DistanceTable2 (distance_list_idx==1)

DistFromBaseMV=DistanceTable[distance_idx]

The MMVD prediction unit 30376 may use a two-dimensional table DistanceTable2d to switch between two distance tables.

DistanceTable2d[ ]={{1, 2, 3, 5}, {4, 8, 16, 32}}

DistFromBaseMV=DistanceTable2d[distance_list_idx][distance_idx]

Derivative of Motion Vector Difference

The MMVD prediction unit 30376 derives refineMvLX from the base motion vector and the magnitude DistFromBaseMV of the motion vector difference. In a case that the merge candidate N related to the central vector is a uni-prediction from an L0 reference picture (predFlagL0N=1, predFlagL1N=0), the MMVD prediction unit 30376 derives the motion vector difference of L0 refineMvL0 from the base motion vector and the magnitude DistFromBaseMV of the motion vector difference.

refineMvL0[0]=(DistFromBaseMV<<shiftMMVD)*mvdUnit[0]

refineMvL0 [1]=(DistFromBaseMV<<shiftMMVD)*mvdUnit[1]

refineMvL1[0]=0 refineMvL1[1]=0

Here, shiftMMVD is a value adjusting the magnitude of the motion vector difference such that the magnitude is suitable for the accuracy MVPREC of the motion vector in the motion compensation unit 3091 (interpolation unit). For example, for MVPREC of 16, or a motion vector accuracy of 1/16 pixels, and four directions, or mvdUnit[0] and mvdUnit[1] being 0 or 1, the use of 2 is appropriate. Additionally, the shift direction of shiftMMVD is not limited to left shift. For mvdUnit[0] and mvdUnit[1] being 0 or a value other than 1 (e.g., 8), for example, in a case of 6, 8, 12, or 16 directions, or the like, the MMVD prediction unit 30376 may perform a right shift. For example, the MMVD prediction unit 30376 may perform multiplication of the base motion vector (mvdUnit[0], mvdUnit[1]) as follows, followed by a right shift.

refineMvL0[0]=(DistFromBaseMV*mvdUnit[0])>>shiftMMVD refineMvL0[1]=(DistFromBaseMV*mvdUnit[1])>>shiftMMVD Furthermore, the MMVD prediction unit 30376 may separately calculate the magnitude and the sign of the motion vector. This similarly applies to the other derivation methods for the motion vector difference.

refineMvL0[0]=((DistFromBaseMV*abs(mvdUnit[0])>>shiftMMVD)*sign (mvdUnit[0])

refineMvL0[1]=((DistFromBaseMV*abs(mvdUnit[1]))>>shiftMMVD)*sign(mvdUnit[1])

Otherwise, in a case that the merge candidate N related to the central vector is a uni-prediction from the L1 reference picture (predFlagL0N=0, predFlagL1N=1), the MMVD prediction unit 30376 derives the L1 motion vector difference refineMvL1 from the base motion vector and the magnitude DistFromBaseMV of the motion vector difference.

refineMvL0[0]=0 refineMvL0[1]=0 refineMvL1[0]=(DistFromBaseMV<<shiftMMVD)*mvdUnit[0]

refineMvL1[1]=(DistFromBaseMV<<shiftMMVD)*mvdUnit [1] or refineMvL1[0]=(DistFromBaseMV*mvdUnit[0])>>shiftMMVD refineMvL1 [1]=(DistFromBaseMV*mvdUnit[1])>>shiftMMVD Otherwise, in a case that the merge candidate N related to the central vector is a bi-prediction (predFlagL0N=1, predFlagL1N=1), the MMVD prediction unit 30376 derives a first motion vector difference firstMv from the base motion vector and the magnitude DistFromBaseMV of the motion vector difference.

firstMv[0]=(DistFromBaseMV<<shiftMMVD)*mvdUnit[0]

firstMv[1]=(DistFromBaseMV<<shiftMMVD)*mvdUnit[1]

or firstMv=(DistFromBaseMV*mvdUnit[0])>>shiftMMVD firstMv=(DistFromBaseMV*mvdUnit[1])>>shiftMMVD Here, the first motion vector difference refineMv corresponds to the motion vector difference with a greater POC distance (POC difference) between the target picture and the reference picture. In other words, assuming that, of the reference pictures in the reference picture list L0 and the reference picture list L1, a reference picture with a greater POC distance (POC difference) between the target picture and the reference picture is the reference picture of the reference picture list LX, the first motion vector difference corresponds to the motion vector difference between the reference image of the reference picture with the greater POC distance (POC difference) (LX) and the target block on the target picture.

Subsequently, the MMVD prediction unit 30376 may scale the first motion vector firstMv to derive a second motion vector (motion vector secondMv of a reference picture with a smaller POC distance) of the other reference picture (reference list LY (Y=1−X)).

For example, in a case that the distance between the target picture currPic and the L0 picture RefPicList0 [refIdxLN0] is greater than the distance between the target picture and the L1 picture RefPicList1 [refIdxLN1], then the first vector firstMv corresponds to the L0 motion vector difference refineMvL0. Furthermore, the MMVD prediction unit 30376 may derive the L1 motion vector difference refineMvL1 by scaling the first vector firstMv.

refineMvL0[0]=firstMv[0]

refineMvL0[1]=firstMv[1]

refineMvL1[0]=Clip3 (−32768, 32767, Sign (distScaleFactor*firstMv[0])* ((Abs (distScaleFactor*refineMvL0[0]+127)>>8))

refineMvL1[1]=Clip3 (−32768, 32767, Sign (distScaleFactor*firstMv[1])*((Abs (distScaleFactor*refineMvL0[1]+127)>>8))

In this regard, the MMVD prediction unit 30376 derives distScaleFactor from a POC difference between currPic and the L0 reference picture DiffPicOrderCnt(currPic, RefPicList0[refIdxLN0]) and a POC difference between currPic and the L1 reference picture DiffPicOrderCnt(currPic, RefPicList1[refIdxLN1]) as follows:

distScaleFactor=Clip3(−4096, 4095, (tb*tx+32)>>6)

tx=(16384+(Abs (td)>>1))/td td=Clip3 (−128, 127, DiffPicOrderCnt (currPic, Ref PicList0 refIdxLN0))

tb=Clip3(−128, 127, DiffPicOrderCnt(currPic, RefPicList1[refIdxLN1]))

Otherwise, in a case that the distance between the target picture currPic and the L0 picture RefPicList0[refIdxLN0] is smaller than or equal to the distance between the target picture and the L1 picture Ref PicList1[refIdxLN1], the first vector firstMv corresponds to the L1 motion vector difference refineMvL1. In this case, the MMVD prediction unit 30376 may scale the first vector firstMv to derive the L0 motion vector difference refineMvL0.

refineMvL0[0]=Clip3 (−32768, 32767, Sign (distScaleFactor*firstMv[0]) *((Abs (distScaleFactor*firstMv[0]+127)>>8))

refineMvL0[1]=Clip3 (−32768, 32767, Sign (distScaleFactor*firstMv[1])*((Abs (distScaleFactor*firstMv[1]+127)>>8))

refineMvL1[0]=firstMv[0]

refineMvL1[1]=firstMv[1]

In this regard, the MMVD prediction unit 30376 derives distScaleFactor from a POC difference between currPic and the L0 reference picture DiffPicOrderCnt(currPic, RefPicList0[refIdxLN0]) and a POC difference between currPic and the L1 reference picture DiffPicOrderCnt(currPic, Ref PicList1[refIdxLN1]) as follows:

distScaleFactor=Clip3(−4096, 4095, (tb*tx+32)>>6)

tx=(16384+(Abs(td)>>1))/td td=Clip3 (−128, 127, DiffPicOrderCnt(currPic, Ref PicList1 [refIdxLN1]))

tb=Clip3(−128, 127, DiffPicOrderCnt(currPic, RefPicList0 [refIdxLN0]))

Note that in a case that the distance between the target picture currPic and the L0 picture RefPicList0[refIdxLN0] is equal to the distance between the target picture and L1 picture RefPicList1[refIdxLN1], the MMVD prediction unit 30376 may configure refineMv to firstMv[ ] in accordance with the following processing (processing A or processing B) without scaling firstMv[ ].

Processing A:

refineMvL0[0]=firstMv[0]

refineMvL0[1]=firstMv[1]

refineMvL1[0]=−firstMv[0]

refineMvL1[1]=−firstMv[1]

Processing B:

refineMvL0[0]=firstMv[0]

refineMvL0[1]=firstMv[1]

refineMvL1[0]=firstMv[0]

refineMvL1[1]=firstMv[1]

More specifically, the MMVD prediction unit 30376 derives refineMv[ ] in accordance with Processing A in a case that the L0 reference picture, the target picture currPic, and the L1 target picture are arranged in time order, and otherwise in accordance with Processing B.

Note that the case that the pictures are arranged in time order is a case of (POC_L0−POC_curr)*(POC_L1−POC_curr)<0, i.e. DiffPicOrderCnt(RefPicList0[refIdxLN0], currPic)*DiffPicOrderCnt(currPic, RefPicList1[refIdxLN1])>0.

Here, the POC_L0, POC_L1, and POC_curr respectively indicate the Picture Order Count of the L0 reference picture, the L1 reference picture, and the target picture.

The reverse case (reverse time order) corresponds to (POC_L0−POC_curr)*(POC_L1−POC_curr)>0, i.e. DiffPicOrderCnt (RefPicList0[refIdxLN0], currPic)*DiffPicOrderCnt (currPic, RefPicList1 refIdxLN1)<0.

Note that, even in a case of that the POC distances are different, the MMVD prediction unit 30376 may scale, after deriving refineMvLX[ ] described above for the case where the POC distances are equal, refineMvLX[ ] in accordance with the POC distance between the reference picture and the target picture to derive a final refineMvLX[ ].

Addition of Central Vector and Motion Vector Difference

Finally, the MMVD prediction unit 30376 derives the motion vector of the MMVD merge candidate from the motion vector difference refineMv[ ] (mvdLX[ ]) and the central vector mvLXN[ ] (mvpLX[ ]), as follows:

mvL0[0]=mvL0N[0]+refineMvL0[0]

mvL0[1]=mvL0N[1]+refineMvL0[1]

mvL1[0]=mvL1N[0]+refineMvL1[0]

mvL1[1]=mvL1N[1]+refineMvL1[1]

Conclusion

Thus, even in a case that the prediction vector is bidirectional, the MMVD prediction unit 30376 signals only one set of information regarding one of the motion vectors (direction_idx, distance_idx). Two motion vectors are derived from the set of information. The MMVD prediction unit 30376 performs scaling of the motion vector as necessary from the difference in POC between each of the two reference pictures and the target picture. The motion vector difference between the reference image of the reference picture LX with the greater POC distance (POC difference) and the target block on the target picture corresponds to the motion vector (firstMv) to be signalled.

firstMv[0]=(DistFromBaseMV<<shiftMMVD)*mvdUnit[0]

firstMv[1]=(DistFromBaseMV<<shiftMMVD)*mvdUnit[1]

The MMVD prediction unit 30376 derives the motion vector mvdLY (secondMv) of the reference picture LY(Y=1−X)

with the smaller POC distance by scaling based on the POC distance ratio (POCS/POCL) between the pictures.

secondMv[0]=(DistFromBaseMV<<shiftMMVD)*mvdUnit[0]*POCS/POCL secondMv[1]=(DistFromBaseMV<<shiftMMVD)*mvdUnit[1]*POCS/POCL Note that the reference picture with the smaller POC distance corresponds to the reference picture with the smaller POC distance (POC difference) between the target picture and the reference picture. Here, POCS is the difference value of the POC difference from the reference picture closer to the target picture, and POCL is the difference value of the POC difference from the reference picture farther from the target picture. Alternatively, the motion vector mvdLY may be derived in accordance with the equation below.

mvd*LY*=MvScale(DistFromBaseMV,CurPic,Pic*LX*,CurPic,Pic*LY*)

Here, CurPic, PicLX, and PicLY respectively represent the target picture, the reference picture farther from the target picture, and the reference picture closer to the target picture.

As described above, the MMVD prediction unit 30376 derives mvpLX[ ](mvLXN[ ]) and mvdLX[ ](refineMv[ ]), which are used to derive the motion vector mvLX[ ] of the target block.

mv*LX*[0]=mvp*LX*[0]+mvd*LX*[0]

mv*LX*[1]=mvp*LX*[1]+mvd*LX*[1]

Rounding of Motion Vector to Nearest Integer

The MMVD prediction unit 30376 may modify the motion vector mvLX of the target block such that the motion vector mvLX indicates an integer pixel position in a case that the magnitude of the motion vector difference mvdLX added to the central vector is greater than a prescribed threshold. For example, the MMVD prediction unit 30376 may perform rounding-off to the nearest integer in a case that DistFromBaseMV is greater than or equal to a prescribed threshold of 16.

The MMVD prediction unit 30376 may perform round-off to the nearest integer in a case that an index distance_list_idx used to select the distance table indicates a specific distance table (e.g. DistanceTable2) and that an index distance_idx that selects elements of the distance table (selects a coefficient of distance) indicates a certain range (e.g., distance_idx is 2 or 3). For example, the MMVD prediction unit 30376 may modify mvLX in accordance with the equation below in a case that distance_list_idx==1 and distance_idx>=2.

Mv*LX*[0]=(mv*LX*[0]/MVPREC)*MVPREC Mv*LX*[1]=(mv*LX*[1]/MVPREC)*MVPREC

Additionally, the MMVD prediction unit 30376 may derive mvLX by using a shift.

mv*LX*[0]=(mv*LX*[0]>>MVBIT)<<MVBIT mv*LX*[1]=(mv*LX*[1]>>MVBIT)<<MVBIT

Here, MVBIT=log 2(MVPREC). For example, 4. Additionally, with positive and negative taken into consideration, the following derivation may be performed.

mv*LX*[0]=mv*LX*[0]>=0?(mv*LX*[0]>>MVBIT)<<MVBIT:−((−mv*LX*[0]>>MVBIT)<<MVBIT)

mv*LX*[1]=mvp*LX*[1]>=0?(mv*LX*[1]>>MVBIT)<<MVBIT:−((−mv*LX*[1]>>MVBIT)<<MVBIT)

By rounding the motion vector to the nearest integer in this way, the amount of computation for generation of a prediction image can be reduced.

Syntax

Figure 16:
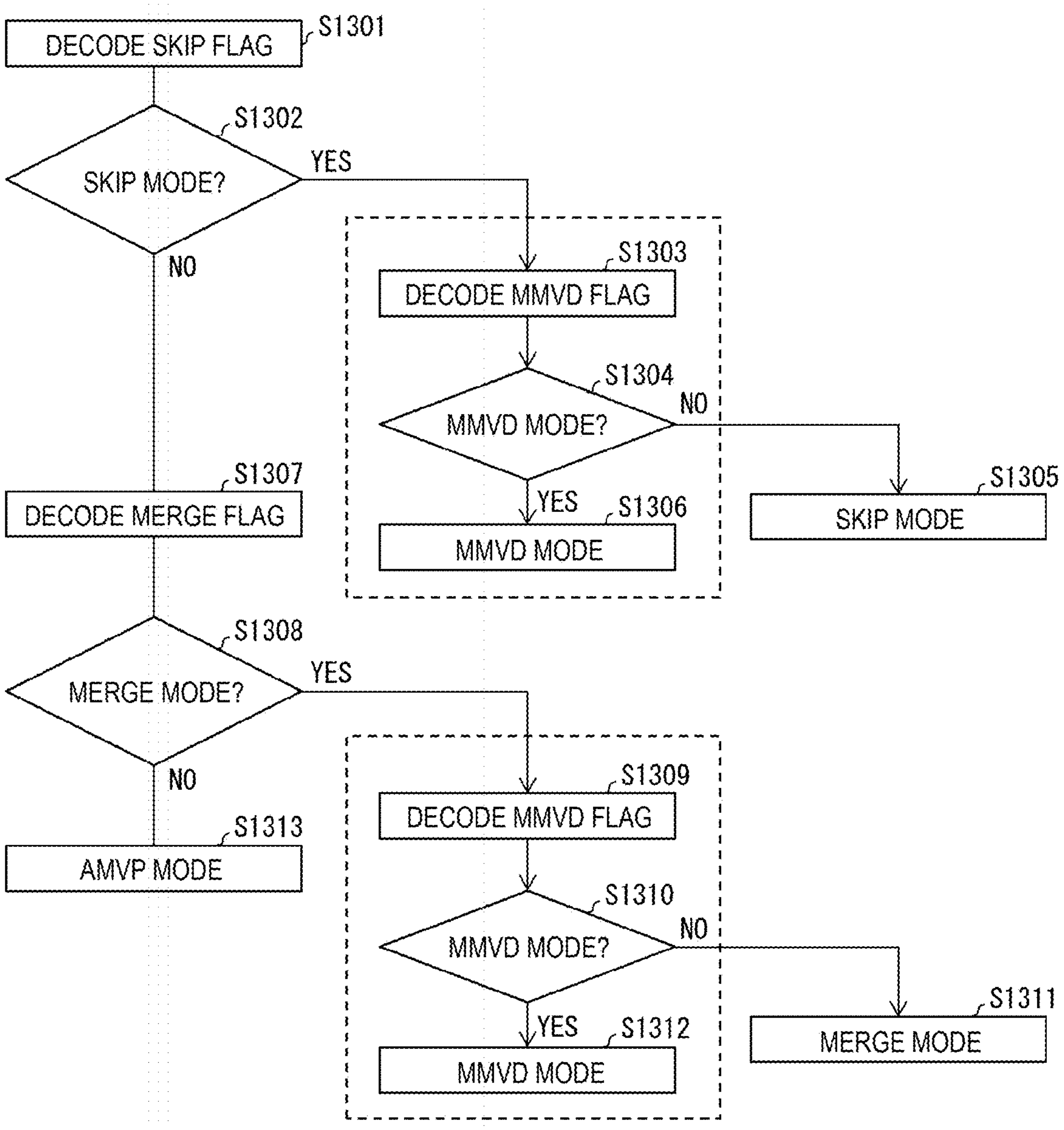
FIG. 16 is a flowchart illustrating a flow of selection processing for a prediction mode in the video decoding apparatus.

Now, a flow of selection processing for the prediction mode in the MMVD prediction unit 30376 will be described with reference to FIG. 16 and FIG. 17. FIG. 16 is a flowchart illustrating the flow of the selection processing for the prediction mode in the MMVD prediction unit 30376. FIG. 17 is a diagram illustrating a syntax indicating the selection processing for the prediction mode according to the present embodiment, and is a syntax table corresponding to a part of the processing illustrated in FIG. 16.

As illustrated in FIG. 16, the parameter decoder 302 first decodes the skip flag (skip_flag in FIG. 17) (S1301). In a case that the skip flag indicates that the skip mode is active (YES in S1302), the parameter decoder 302 decodes an MMVD flag (mmvd_flag in FIG. 17) (S1303). In a case that the MMVD flag does not indicate that the MMVD mode is active (NO in S1304), then the prediction mode is the skip mode (S1305). In the skip mode, as illustrated in FIG. 17, the parameter decoder 302 decodes the merge index (merge_idx in FIG. 17).

In a case that the MMVD flag indicates that the MMVD mode is active (YES in S1304), the prediction mode is the MMVD mode (S1306). In the MMVD mode, as illustrated in FIG. 17, the parameter decoder 302 decodes base_candidate_idx, distance_idx, and direction_idx.

In a case that the skip flag does not indicate that the skip mode is active (NO in S1302), the parameter decoder 302 decodes the merge flag (merge_flag in FIG. 17) (S1307). In a case that the merge flag indicates that the merge mode is active (YES in S1308), the parameter decoder 302 decodes the MMVD flag (mmvd_flag in FIG. 17) (S1309). In a case that the MMVD flag does not indicate that the MMVD mode is active (NO in S1310), the prediction mode is the merge mode (S1311). In the merge mode, as illustrated in FIG. 17, the parameter decoder 302 decodes the merge index (merge_idx in FIG. 17).

In a case that the MMVD flag indicates that the MMVD mode is active (YES in S1310), then the prediction mode is the MMVD mode (S1312). In the MMVD mode, as illustrated in FIG. 17, the parameter decoder 302 decodes base_candidate_idx, distance_idx, and direction_idx.

In a case that the merge flag does not indicate that the merge mode is active (NO in S1308), the prediction mode is the AMVP mode (S1313).

In the skip mode and the merge mode, the parameter decoder 302 decodes merge_idx.

In the MMVD mode, the parameter decoder 302 decodes base_candidate_idx, distance_idx, and direction_idx. The MMVD prediction unit 30376 uses these parameters to derive mvpLX and mvdLX. The MMVD prediction unit 30376 then derives mvLX.

Figure 18:
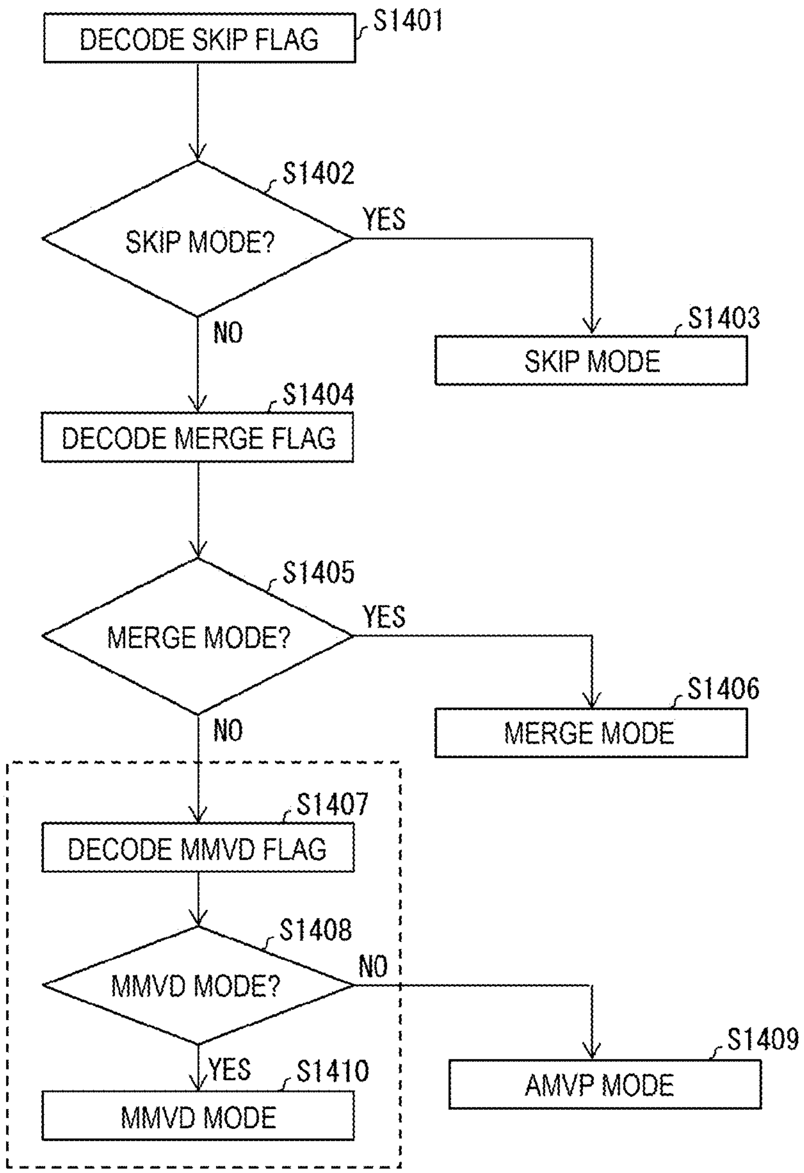
FIG. 18 is a flowchart illustrating a flow of the selection processing for a prediction mode in the video decoding apparatus.

Now, a flow of selection processing for the prediction mode in the MMVD prediction unit 30376 according to another embodiment of the present invention will be described with reference to FIG. 18 and FIG. 19. FIG. 18 is a flowchart illustrating the flow of the selection processing for the prediction mode in the MMVD prediction unit 30376. FIG. 19 is a diagram illustrating a syntax indicating the selection processing for the prediction mode according to the present embodiment, and is a syntax table corresponding to a part of the processing illustrated in FIG. 18.

In the flowchart of FIG. 16 and the syntax of FIG. 17, processing is present in which the MMVD flag is decoded in the skip mode and the merge mode. In a case that encoding and decoding are to be performed at a high compression rate, the skip mode or the merge mode is relatively often selected, and in that case, the presence of the MMVD flag acts as an overhead. In the flowchart of FIG. 18 and the syntax of FIG. 19, the MMVD prediction unit 30376 selects the MMVD mode in a case that neither the skip mode nor the merge mode is selected.

As illustrated in FIG. 18, in the present embodiment, the parameter decoder 302 first decodes the skip flag (skip_flag in FIG. 19) (S1401). In a case that the skip flag indicates that the skip mode is active (YES in S1402), then the prediction mode is the skip mode (S1403). In the skip mode, as illustrated in FIG. 19, the parameter decoder 302 decodes the merge index (merge_idx in FIG. 19).

In a case that the skip flag does not indicate that the skip mode is active (NO in S1402), the parameter decoder 302 decodes the merge flag (merge_flag in FIG. 19) (S1404). In a case that the merge flag indicates that the merge mode is active (YES in S1405), the prediction mode is the merge mode (S1406). In the merge mode, as illustrated in FIG. 19, the parameter decoder 302 decodes the merge index (merge_idx in FIG. 19).

In a case that the merge flag does not indicate that the merge mode is active (NO in S1405), the parameter decoder 302 decodes the MMVD flag (mmvd_flag in FIG. 19) (S1407). In a case that the MMVD flag does not indicate that the MMVD mode is active (NO in S1408), the prediction mode is the AMVP mode (S1409). In a case that the MMVD flag indicates that the MMVD mode is active (YES in S1408), then the prediction mode is the MMVD mode (S1410). In the MMVD mode, as illustrated in FIG. 19, the parameter decoder 302 decodes base_candidate_idx, distance_idx, and direction_idx. The parameter coder 111 performs a similar operation to code the syntax.

Note that in a case that the merge mode is active, since the difference between the merge mode and the skip mode is whether a prediction residual is used for generation of a prediction image, the parameter decoder 302 does not need to decode, into a syntax, a flag indicating whether inverse transform processing follows the processing in FIG. 18 and FIG. 19. On the other hand, in a case that the MMVD mode is active, generation of a prediction image can be performed in a manner different from the manner in the skip mode, and thus the parameter decoder 302 needs to decode, into a syntax, the flag indicating whether inverse transform processing follows.

In such a configuration, in a case that a large number of skip flags indicate the skip mode, which involves no prediction residuals, in a case that coding with a high compression rate is performed, the MMVD flag need not be decoded. This prevents coding efficiency from being reduced.

Figure 20:
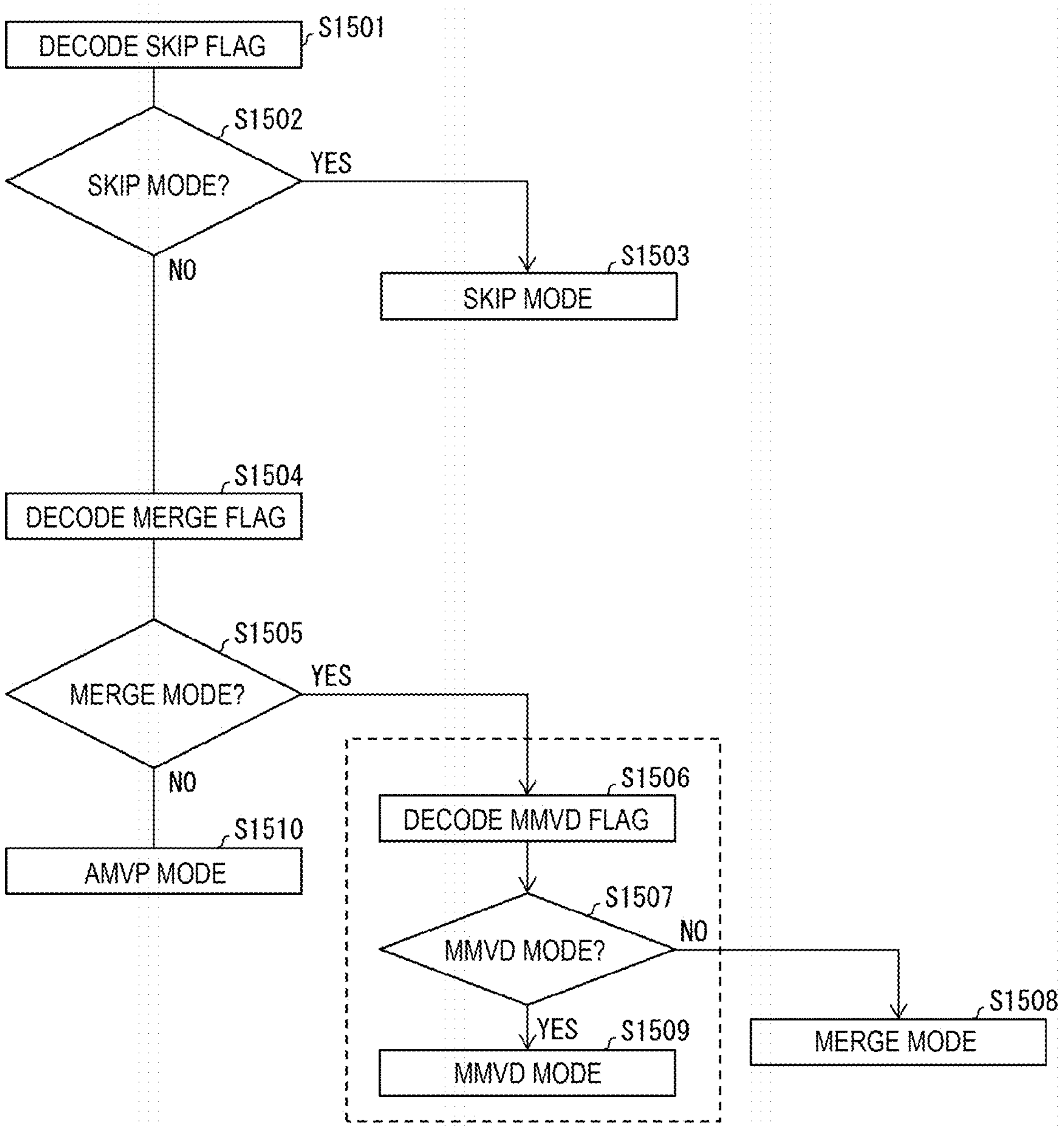
FIG. 20 is a flowchart illustrating a flow of the selection processing for a prediction mode in the video decoding apparatus.

Now, the flow of the selection processing for the prediction mode in the MMVD prediction unit 30376 according to the embodiment of the present invention will be described with reference to FIG. 20 and FIG. 21. FIG. 20 is a flowchart illustrating the flow of the selection processing for the prediction mode in the MMVD prediction unit 30376. FIG. 21 is a diagram illustrating a syntax indicating the selection processing for the prediction mode according to the present embodiment, and is a syntax table corresponding to a part of the processing illustrated in FIG. 20.

In the flowchart of FIG. 20 and the syntax of FIG. 21, the MMVD prediction is not performed in the skip mode and can be selected only in the merge mode.

As illustrated in FIG. 20, in the present embodiment, the parameter decoder 302 (prediction parameter decoder) first decodes the skip flag (skip_flag in FIG. 21) (S1501). In a case that the skip flag indicates that the skip mode is active (YES in S1502), then the prediction mode is the skip mode (S1503). In the skip mode, as illustrated in FIG. 20, the parameter decoder 302 decodes the merge index (merge_idx in FIG. 21).

In a case that the skip flag does not indicate that the skip mode is active (NO in S1502), the prediction parameter decoder 302 decodes the merge flag (merge_flag in FIG. 21) (S1504). In a case that the merge flag indicates that the merge mode is active (YES in S1505), the parameter decoder 302 decodes the MMVD flag (mmvd_flag in FIG. 21) (S1506). In a case that the MMVD flag does not indicate that the MMVD mode is active (NO in S1507), the prediction mode is the merge mode (S1508). In the merge mode, as illustrated in FIG. 21, the parameter decoder 302 decodes the merge index (merge_idx in FIG. 21). In a case that the MMVD flag indicates that the MMVD mode is active (YES in S1507), then the prediction mode is the MMVD mode (S1509). In the MMVD mode, as illustrated in FIG. 21, the parameter decoder 302 decodes base_candidate_idx, distance_idx, and direction_idx.

In a case that the merge flag does not indicate that the merge mode is active (NO in S1505), the prediction mode is the AMVP mode (S1510). The parameter coder 111 performs a similar operation to code the syntax.

Note that in a case where neither the merge mode nor the MMVD mode is active, since the difference between these modes and the skip mode is whether prediction residuals are used for generation of a prediction image, the parameter decoder 302 need not decode, into a syntax, the flag indicating whether inverse transform processing follows the processing in FIG. 20 and FIG. 21. On the other hand, in a case that the MMVD mode is active instead of the merge mode, generation of a prediction image different from that in the skip mode is possible, and hence the parameter decoder 302 needs to decode, into a syntax, the flag indicating whether the inverse transform processing follows.

In such a configuration, in a case that a large number of skip flags indicate the skip mode, which involves no prediction residuals, in a case that coding with a high compression rate is performed, the MMVD flag need not be decoded. This prevents coding efficiency from being reduced.

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores a parameter decoded by the parameter decoder 302, the prediction mode predMode decoded by the entropy decoder 301, and the like.

To the prediction image generation unit 308, the prediction mode predMode, the prediction parameter, and the like are input. In addition, the prediction image generation unit 308 reads a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referred to for generating a prediction image.

Inter Prediction Image Generation Unit 309

In a case that the prediction mode predMode indicates an inter prediction mode, the inter prediction image generation unit 309 generates a prediction image of a block or a subblock using an inter prediction by using the inter prediction parameter input from the inter prediction parameter decoder 303 and the read reference picture.

Figure 11:
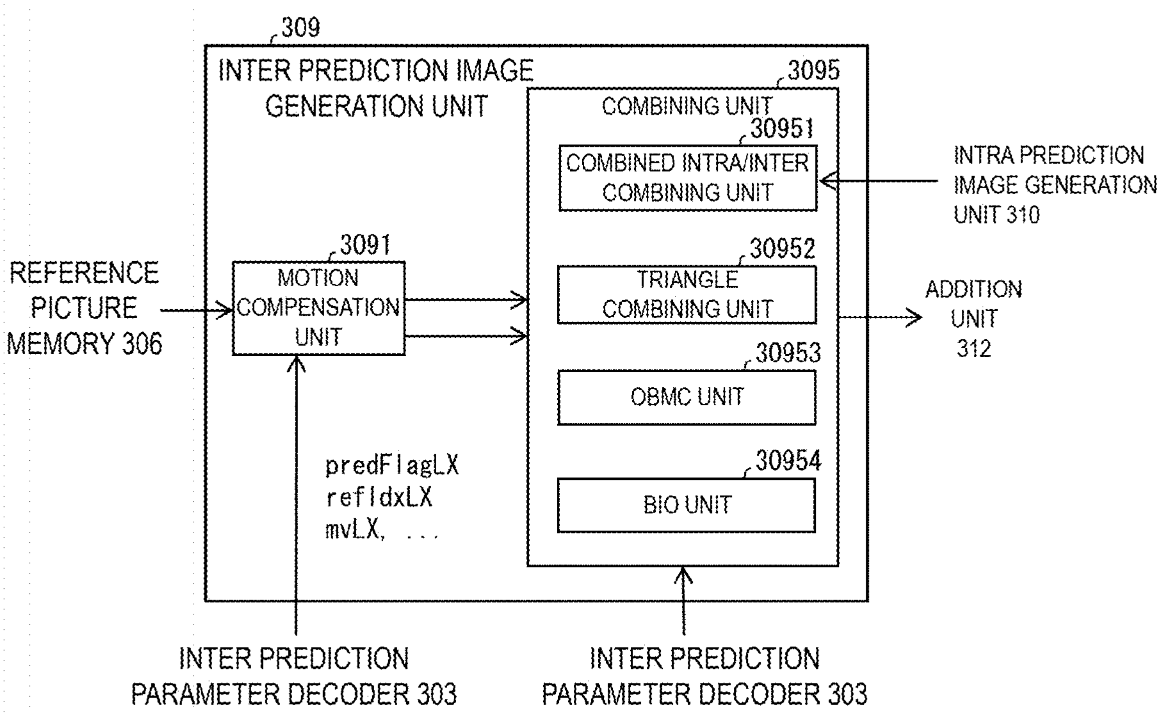
FIG. 11 is a schematic diagram illustrating a configuration of an inter prediction image generation unit.

FIG. 11 is a schematic diagram illustrating the configuration of the inter prediction image generation unit 309 included in the prediction image generation unit 308 according to the present embodiment. The inter prediction image generation unit 309 includes a motion compensation unit (prediction image generation apparatus) 3091 and a combining unit 3095.

Motion Compensation

The motion compensation unit 3091 (interpolation image generation unit 3091) generates an interpolation image (motion compensation image), based on the inter prediction parameters (prediction list utilization flag predFlagLX, reference picture index refIdxLX, motion vector mvLX) input from the inter prediction parameter decoder 303, by reading, from the reference picture memory 306, a block at a position shifted by the motion vector mvLX while taking the position of the target block in a reference picture RefPicLX specified by the reference picture index refIdxLX as the starting point. Here, in a case that the accuracy of the motion vector mvLX is not an integer accuracy, by applying a filter for generating a pixel of a fractional position called a motion compensation filter, the interpolation image is generated.

The motion compensation unit 3091 first derives an integer position (xInt, yInt) and a phase (xFrac, yFrac) corresponding to in-prediction block coordinates (x, y) by the following equation.

$$xInt=xPb+(mvLX[0]>>(\log 2(MVPREC)))+x$$

$$xFrac=mvLX[0]\&(MVPREC-1)$$

$$yInt=yPb+(mvLX[1]>>(\log 2(MVPREC)))+y$$

$$yFrac=mvLX[1]\&(MVPREC-1)$$

Here, (xPb, yPb) indicates the upper left coordinates of a block with a bW*bH size, that is, x=0 . . . bW−1, y=0 . . . bH−1, and MVPREC indicates the accuracy of the motion vector mvLX (1/MVPREC pixel accuracy). For example, MVPREC may be 16.

The motion compensation unit 3091 derives a temporary image temp[ ][ ] by performing horizontal interpolation processing on a reference picture refImg using an interpolation filter. In the following equation, Σ is the sum related to k of k=0, . . . , NTAP−1, shift1 is a normalization parameter for adjusting a value range, and offset1=1<<(shift1−1).

$$temp[x][y]=(\Sigma mcFilter[xFrac][k]*refImg[xInt+k-NTAP/2+1][yInt]+offset1)>>shift1$$

Subsequently, the motion compensation unit 3091 derives an interpolation image Pred[ ][ ] by performing vertical interpolation processing on the temporary image temp[ ][ ]. In the following equation, Σ is the sum related to k of k=0, . . . , NTAP−1, shift2 is a normalization parameter for adjusting a value range, and offset2=1<<(shift2−1).

$$Pred[x][y]=(\Sigma mcFilter[xFrac][k]*temp[x][y+k-NTAP/2+1]+offset2)>>shift2$$

(Combining Unit)

The combining unit 3095 references an interpolation image supplied by the motion compensation unit 3091, an inter prediction parameter supplied by the inter prediction parameter decoder 303, and an intra image supplied by the intra prediction image generation unit 310, to generate a prediction image, and supplies the generated prediction image to the addition unit 312.

The combining unit 3095 includes a Combined intra/inter combining unit 30951, a Triangle combining unit 30952, an OBMC unit 30953, and a BIO unit 30954.

(Combined Intra/Inter Combining Processing)

The Combined intra/inter combining unit 30951 generates a prediction image by compositionally using the uni-prediction, skip mode, merge mode, and intra prediction in AMVP.

Triangle Combining Processing

The Triangle combining unit 30952 generates a prediction image using the Triangle prediction described above.

OBMC Processing

The OBMC unit 30953 generates a prediction image by using Overlapped block motion compensation (OBMC) processing. The OBMC processing includes the following processing.

- An interpolation image (motion compensation image) of a target subblock is generated by using an interpolation image (PU interpolation image) generated by using an inter prediction parameter added to the target subblock, and an interpolation image (OBMC interpolation image) generated by using a motion parameter of an adjacent subblock of the target subblock.
- A prediction image is generated by weighted-averaging the OBMC interpolation image and the PU interpolation image.

BIO Processing

The BIO unit 30954 generates a prediction image by performing an i-directional optical flow (BIO) (bi-prediction gradient change) processing. In the BIO processing, a prediction image is generated with reference to motion compensation images PredL0 and PredL1 and a gradient correction term. The BIO unit 30954 may be configured to generate a prediction image by performing a weighted prediction described below.

Weighted Prediction

In the weighted prediction, a prediction image of a block is generated by multiplying the interpolation image PredLX by a weight coefficient. In a case that one of prediction list utilization flags (predFlagL0 or predFlagL1) is 1 (uni-prediction) and no weighted prediction is used, processing in accordance with the following equation is executed in which a motion compensation image PredLX (LX is L0 or L1) is adapted to the number of pixel bits bitDepth.

$$Pred[x][y]=Clip3(0,(1<<bitDepth)-1,(PredLX[x][y]+offset1)>>shift1)$$

Here, shift1=14−bitDepth, offset1=1<<(shift1−1) are established. Furthermore, in a case that both of reference list utilization flags (predFlagL0 and predFlagL1) are 1 (bi-prediction BiPred) and no weight prediction is used, processing in accordance with the following equation is executed in which the motion compensation images PredL0 and PredL1 are averaged and adapted to the number of pixel bits.

$$Pred[x][y]=Clip3(0,(1<<bitDepth)-1,(PredL0[x][y]+PredL1[x][y]+offset2)>>shift2)$$

Here, shift2=15−bitDepth, offset2=1<<(shift2−1) are established.

Furthermore, in a case that the uni-prediction and the weighted prediction are performed, the weight prediction unit 3094 derives a weighted prediction coefficient w0 and an offset o0 from coded data, and performs processing by the following equation.

$$Pred[x][y]=Clip3(0,(1<<bitDepth)-1,((PredLX[x][y]*w0+2^{(log2WD-1)})>>log2WD)+o0)$$

Here, log 2WD is a variable indicating a prescribed shift amount.

Furthermore, in a case that the bi-prediction BiPred and the weight prediction are performed, the weight prediction unit 3094 derives weight coefficients w0, w1, o0, and o1 from coded data, and performs processing in accordance with the equation below.

$$Pred[x][y]=Clip3(0,(1<<bitDepth)-1,(PredL0[x][y]*w0+PredL1[x][y]*w1+((o0+o1+1)<<log2WD))>>(log2WD+1))$$

Then, the generated prediction image of the block is output to the addition unit 312.

The inverse quantization and inverse transform processing unit 311 performs inverse quantization on a quantization transform coefficient input from the entropy decoder 301 to calculate a transform coefficient. This quantization transform coefficient is a coefficient obtained by performing, in coding processing, a frequency transform such as a Discrete Cosine Transform (DCT) or a Discrete Sine Transform (DST) on prediction errors for quantization. The inverse quantization and inverse transform processing unit 311 performs an inverse frequency transform such as an inverse DCT or an inverse DST on the calculated transform coefficient to calculate a prediction error. The inverse quantization and inverse transform processing unit 311 outputs the calculated prediction error to the addition unit 312. The inverse quantization and inverse transform processing unit 311 configures all prediction errors to zero in a case that skip_flag is 1 or in a case that cu_cbp is 0.

The addition unit 312 adds the prediction image of the block input from the prediction image generation unit 308 and the prediction error input from the inverse quantization and inverse transform processing unit 311 to each other for each pixel, and generates a decoded image of the block. The addition unit 312 stores the decoded image of the block in the reference picture memory 306, and also outputs it to the loop filter 305.

Configuration of Video Coding Apparatus

Figure 12:
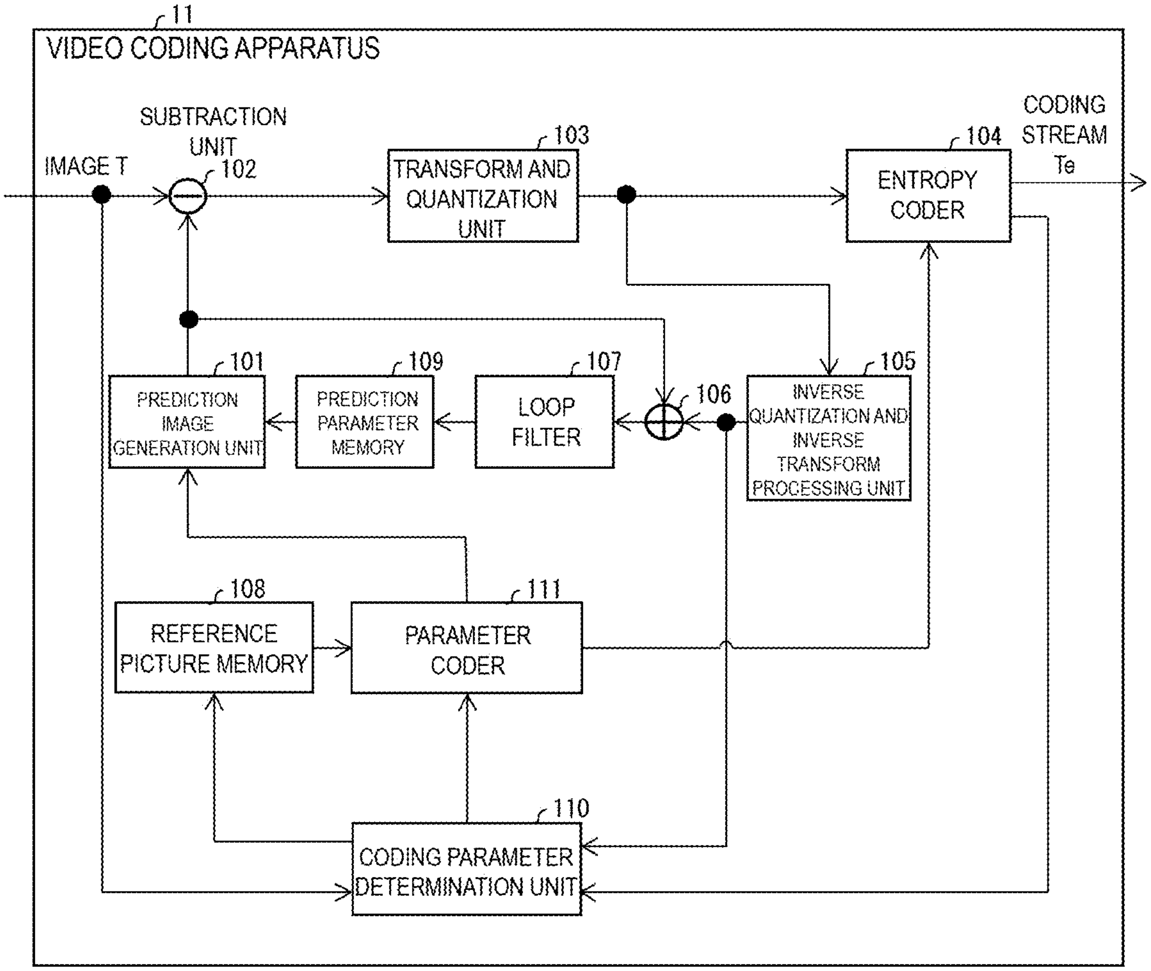
FIG. 12 is a block diagram illustrating a configuration of a video coding apparatus.

Next, a configuration of the video coding apparatus 11 according to the present embodiment will be described. FIG. 12 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, and an entropy coder 104.

The prediction image generation unit 101 generates a prediction image for each CU that is a region obtained by splitting each picture of an image T. The operation of the prediction image generation unit 101 is the same as that of the prediction image generation unit 308 already described, and description thereof will be omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the entropy coder 104 and the inverse quantization and inverse transform processing unit 105.

The inverse quantization and inverse transform processing unit 105 is the same as the inverse quantization and inverse transform processing unit 311 (FIG. 7) in the video decoding apparatus 31, and descriptions thereof are omitted. The calculated prediction error is output to the addition unit 106.

To the entropy coder 104, the quantization transform coefficient is input from the transform and quantization unit 103, and coding parameters are input from the parameter coder 111. For example, coding parameters include codes such as a reference picture index refIdxLX, a prediction vector index mvp_LX_idx, a motion vector difference mvdLX, a motion vector accuracy mode amvr_mode, a prediction mode predMode, and a merge index merge_idx.

The entropy coder 104 performs entropy coding on split information, the prediction parameters, the quantization transform coefficient, and the like to generate and output a coding stream Te.

The parameter coder 111 includes a header coder 1110, a CT information coder 1111, a CU coder 1112 (prediction mode coder), and a parameter coder 112, which are not illustrated. The CU coder 1112 further includes a TU coder 1114.

General operation of each module will be described below. The parameter coder 111 performs coding processing on parameters such as header information, split information, prediction information, quantization transform coefficients, and the like.

The CT information coder 1111 codes QT, MT (BT, TT) split information, and the like from the coded data.

The CU coder 1112 codes CU information, prediction information, a TU split flag split_transform_flag, CU residual flags cbf_cb, cbf_cr, cbf_luma, and the like.

In a case that a TU includes a prediction error, the TU coder 1114 codes QP update information (quantization correction value) and quantization prediction error (residual_coding).

The CT information coder 1111 and the CU coder 1112 feeds the entropy coder 104 with syntax elements such as inter prediction parameters (prediction mode predMode, merge flag merge_flag, merge index merge_idx, inter prediction identifier inter_pred_idc, reference picture index refIdxLX, prediction vector index mvp_Lx_idx, and motion vector difference mvdLX), intra prediction parameters (prev_intra_luma_pred_flag, mpm_idx, rem_selected_mode_flag, rem_selected_mode, rem_non_selected_mode), and quantization transform coefficients.

Configuration of Parameter coder

The parameter coder 112 derives inter prediction parameters, based on the prediction parameters input from the coding parameter determination unit 110. The parameter coder 112 includes a configuration partly identical to a configuration in which the inter prediction parameter decoder 303 derives inter prediction parameters.

Figure 13:
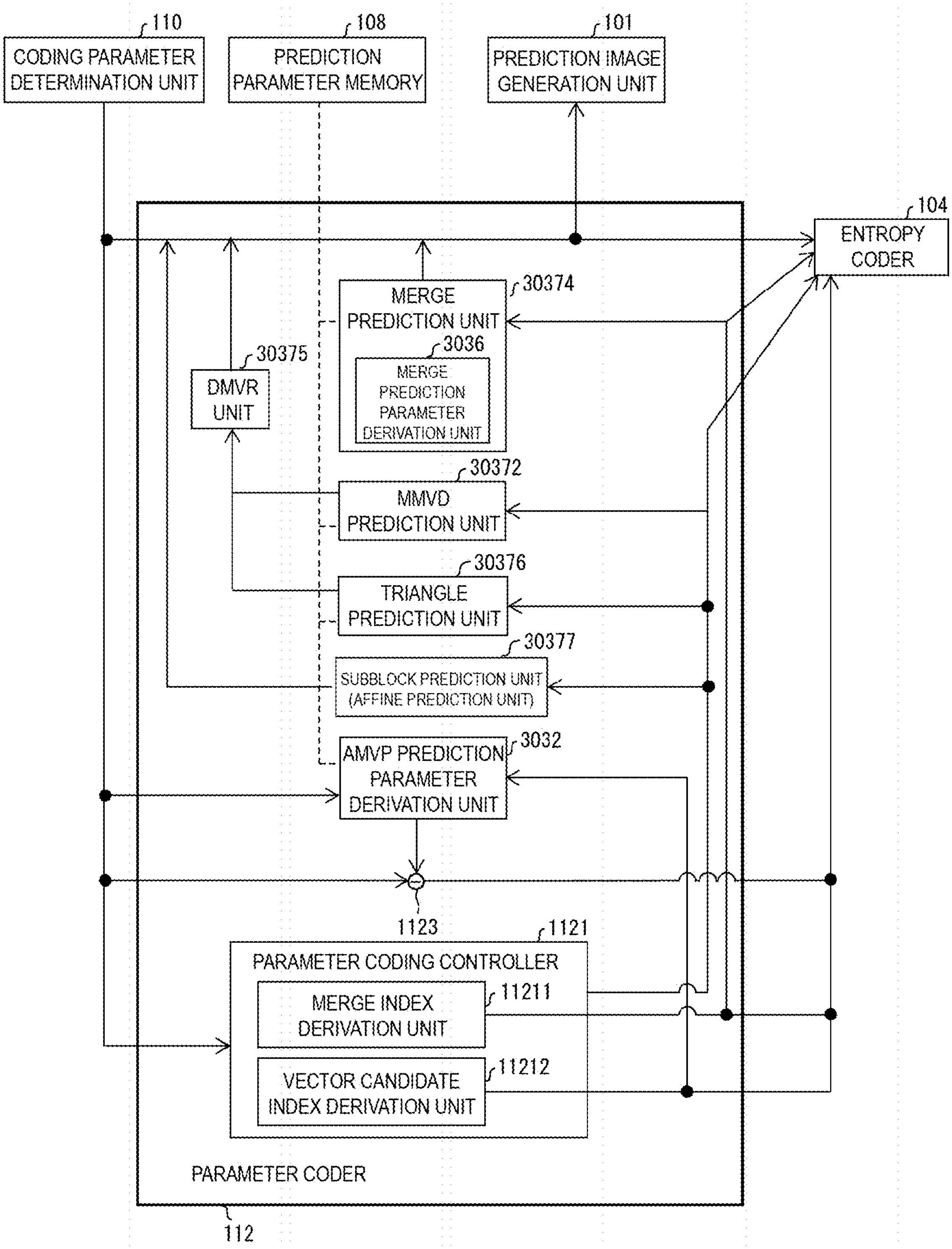
FIG. 13 is a schematic diagram illustrating a configuration of a parameter coder.

FIG. 13 is a schematic diagram illustrating a configuration of the parameter coder 112. A configuration of the parameter coder 112 will be described. As illustrated in FIG. 13, the parameter coder 112 includes a parameter coding controller 1121, the merge prediction unit 30374, the subblock prediction unit (affine prediction unit) 30372, the DMVR unit 30375, the MMVD prediction unit 30376, the Triangle prediction unit 30377, the AMVP prediction parameter derivation unit 3032, and a subtraction unit 1123. The merge prediction unit 30374 includes the merge prediction parameter derivation unit 3036. The parameter coding controller 1121 includes a merge index derivation unit 11211 and a vector candidate index derivation unit 11212. The parameter coding controller 1121 derives merge_idx, affine_flag, base_candidate_idx, distance_idx, direction_idx, etc. in the merge index derivation unit 11211, and derives mvpLX and the like from the vector candidate index derivation unit 11212. The merge prediction parameter derivation unit 3036, the AMVP prediction parameter derivation unit 3032, the affine prediction unit 30372, the MMVD prediction unit 30376, and the Triangle prediction unit 30377 may be collectively referred to as a motion vector derivation unit (motion vector derivation apparatus). The parameter coder 112 outputs, to the prediction image generation unit 101, the motion vector mvLX, the reference picture index refIdxLX, the inter prediction indicator inter_pred_idc, or information indicating these. Furthermore, the parameter coder 112 outputs, to the entropy coder 104, merge_flag, skip_flag, merge_idx, inter_pred_idc, refIdxLX, mvp_1X_idx, mvdLX, amvr_mode, and affine_flag.

The parameter coding controller 1121 derives parameters representing a motion vector difference (base_candidate_idx, distance_idx, direction_idx, etc.), and outputs the derived parameters to the MMVD prediction unit 30376. The motion vector difference derivation in the parameter coding controller 1121 will be described with reference to FIG. 15. A central solid circle in the figure is a location indicated by the prediction vector mvpLX, and searches for eight search distances around the location in four (up, down, left, right) directions. mvpLX is the motion vectors of the leading and second candidates in the merge candidate list, and each of the motion vectors is searched for. Two prediction vectors are present in the merge candidate list (first and second prediction vectors in the list), and eight search distances and four search directions are present, and thus mvdLX involves 64 candidates. One of the candidates mvdLX searched for that involves the lowest cost is represented by base_candidate_idx, distance_idx, and direction_idx.

In this manner, the MMVD mode is a mode in which limited candidate points around the prediction vector are searched for to derive the appropriate motion vector.

The merge index derivation unit 11211 derives the merge index merge_idx, and outputs it to the merge prediction parameter derivation unit 3036 (merge prediction unit). In the MMVD mode, the merge index derivation unit 11211 configures the value of the merge index merge_idx to the same value as the value of base_candidate_idx. The vector candidate index derivation unit 11212 derives the prediction vector index mvp_1X_idx.

The merge prediction parameter derivation unit 3036 derives the inter prediction parameter based on the merge index merge_idx.

The AMVP prediction parameter derivation unit 3032 derives the prediction vector mvpLX based on the motion vector mvLX. The AMVP prediction parameter derivation unit 3032 outputs the prediction vector mvpLX to the subtraction unit 1123. Note that the reference picture index refIdxLX and the prediction vector index mvp_1X_idx are output to the entropy coder 104.

The affine prediction unit 30372 derives an inter prediction parameter (affine prediction parameter) of a subblock.

The subtraction unit 1123 subtracts the prediction vector mvpLX, which is the output of the AMVP prediction parameter derivation unit 3032, from the motion vector mvLX input from the coding parameter determination unit 110, and generates the motion vector difference mvdLX. The subtraction unit 1123 outputs the motion vector difference mvdLX to the entropy coder 104.

The addition unit 106 adds a pixel value of the prediction image of the block input from the prediction image generation unit 101 and the prediction error input from the inverse quantization and inverse transform processing unit 105 to each other for each pixel, and generates a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The coding parameter determination unit 110 selects a set of coding parameters of which cost value calculated is a minimum value. With this configuration, the entropy coder 104 outputs the selected set of coding parameters as the coding stream Te. The coding parameter determination unit 110 stores the determined coding parameters in the prediction parameter memory 108.

Note that, some of the video coding apparatus 11 and the video decoding apparatus 31 in the above-described embodiment, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, and the parameter coder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case.

Furthermore, the above-described program may be one for realizing some of the above-described functions, and also may be one capable of realizing the above-described functions in combination with a program already recorded in a computer system.

Furthermore, a part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiment and various amendments can be made to a design that fall within the scope that does not depart from the gist of the present invention.

Application Examples

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

At first, referring to FIG. 2, it will be described that the above-mentioned video coding apparatus 11 and the video decoding apparatus 31 can be utilized for transmission and reception of videos.

Figure 2:
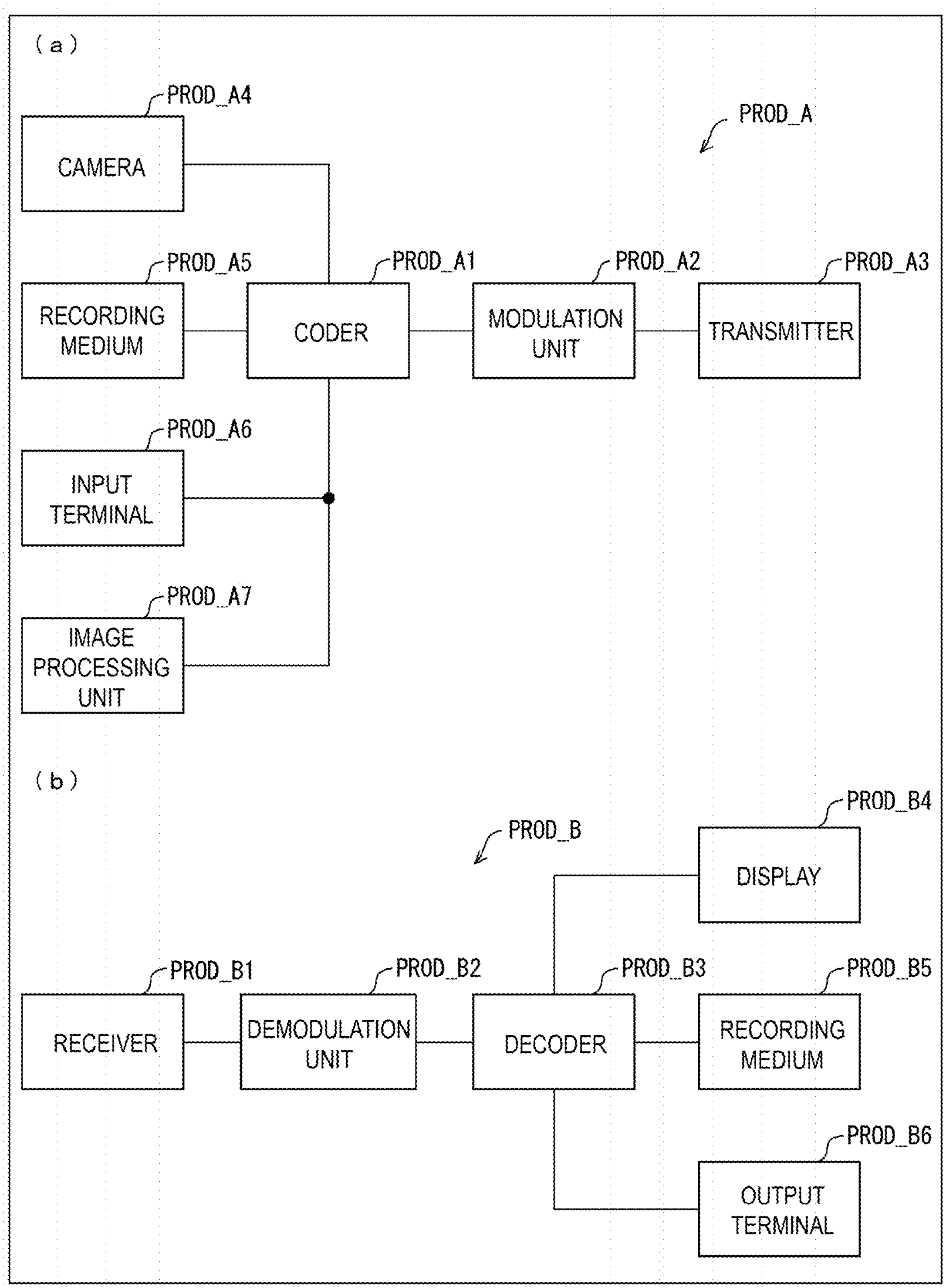
FIG. 2 is a diagram illustrating configurations of a transmitting apparatus equipped with a video coding apparatus and a receiving apparatus equipped with a video decoding apparatus according to the present embodiment. (a) thereof illustrates the transmitting apparatus equipped with the video coding apparatus, and (b) thereof illustrates the receiving apparatus equipped with the video decoding apparatus.

FIG. 2(*a*) is a block diagram illustrating a configuration of a transmitting apparatus PROD_A installed with the video coding apparatus 11. As illustrated in the diagram, the transmitting apparatus PROD_A includes an coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in the diagram, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2(*b*) is a block diagram illustrating a configuration of a receiving apparatus PROD_B installed with the video decoding apparatus 31. As illustrated in the diagram, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in the diagram, some of the constituents may be omitted.

Note that the recording medium PROD_B5 may record videos which are not coded, or may record videos which are coded in a coding scheme for recording different from a coding scheme for transmission. In the latter case, an coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Next, referring to FIG. 3, it will be described that the above-mentioned video coding apparatus 11 and the video decoding apparatus 31 can be utilized for recording and regeneration of videos.

Figure 3:
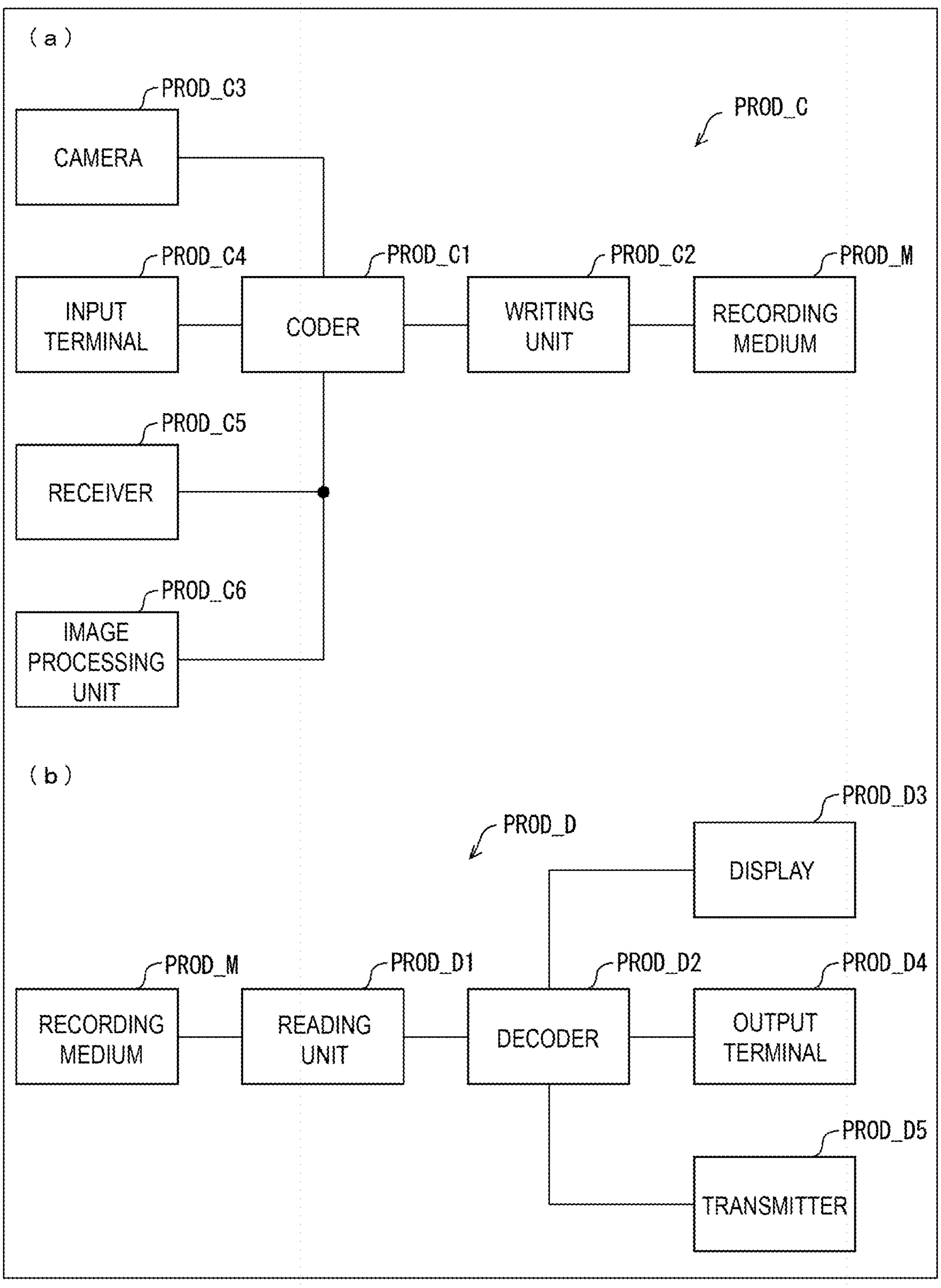
FIG. 3 is a diagram illustrating configurations of a recording apparatus equipped with the video coding apparatus and a reconstruction apparatus equipped with the video decoding apparatus according to the present embodiment. (a) thereof illustrates the recording apparatus equipped with the video coding apparatus, and (b) thereof illustrates the reconstruction apparatus equipped with the video decoding apparatus.

FIG. 3(*a*) is a block diagram illustrating a configuration of a recording apparatus PROD_C installed with the above-mentioned video coding apparatus 11. As illustrated in the diagram, the recording apparatus PROD_C includes an coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in the diagram, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3(*b*) is a block illustrating a configuration of a reconstruction apparatus PROD_D installed with the above-mentioned video decoding apparatus 31. As illustrated in the diagram, the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in the diagram, some of the constituents may be omitted.

Note that the transmitter PROD_D5 may transmit a video which is not coded or may transmit coded data coded in the coding scheme for transmission different from a coding scheme for recording. In the latter case, an coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. In addition, an objective of the embodiment of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiment of the present invention can be also realized in the form of computer data signals embedded in a carrier such that the transmission of the program codes is embodied in electronic transmission.

The embodiment of the present invention is not limited to the above-described embodiment, and various modifications are possible within the scope of the claims. That is, an embodiment obtained by combining technical means modified appropriately within the scope defined by claims is included in the technical scope of the present invention as well.

CROSS-REFERENCE OF RELATED APPLICATION

This application claims the benefit of priority to JP 2018-230199 filed on Dec. 7, 2018, which is incorporated herein by reference in its entirety.

Another Description of Present Invention

Note that the present invention is also described as follows.

In other words, an image decoding apparatus according to an aspect of the present invention includes a parameter decoder configured to decode a parameter for generating a prediction image, the parameter decoder decodes a skip flag indicating whether a skip mode in which no prediction residual is present is applied, and in a case that the skip flag does not indicate the skip mode, decodes a merge flag indicating whether a merge mode is applied that allows motion vector information to be obtained from a merge candidate, and in a case that the merge flag does not indicate the merge mode, decodes an MMVD flag indicating whether an MMVD mode is applied that allows, in addition to the motion vector information obtained from the merge candidate described above, motion vector information to be obtained by decoding, from coded data, motion vector information regarding a difference in a prescribed direction.

An image decoding apparatus according to an aspect of the present invention includes a parameter decoder configured to decode a parameter for generating a prediction image, and the parameter decoder decodes a skip flag indicating whether a skip mode in which no prediction residual is present is applied, and in a case that the skip flag does not indicate the skip mode, decodes a merge flag indicating whether a merge mode is applied that allows motion vector information to be obtained from a merge candidate, and in a case that the merge flag indicates the merge mode, decodes an MMVD flag indicating an MMVD mode is applied that allows, in addition to the motion vector information obtained from the merge candidate described above, motion vector information to be obtained by decoding, from coded data, motion vector information of a difference in a prescribed direction.

An image coding apparatus according to an aspect of the present invention includes a parameter coder configured to code a parameter for generating a prediction image, and the parameter coder codes a skip flag indicating whether a skip mode in which no prediction residual is present is applied, and in a case that the skip flag does not indicate the skip mode, codes a merge flag indicating whether a merge mode is applied that allows motion vector information to be obtained from the merge candidate, and in a case that the merge flag does not indicate the merge mode, codes an MMVD flag indicating whether an MMVD mode is applied that allows, in addition to the motion vector information obtained from the merge candidate described above, motion vector information to be obtained by coding motion vector information of a difference in a prescribed direction.

An image coding apparatus according to an aspect of the present invention includes a parameter coder configured to code a parameter for generating a prediction image, and the parameter coder codes a skip flag indicating whether a skip mode in which no prediction residual is present is applied, and in a case that the skip flag does not indicate the skip mode, codes a merge flag indicating whether a merge mode is applied that allows motion vector information to be obtained from the merge candidate, and in a case that the merge flag indicates the merge mode, codes an MMVD flag indicating whether an MMVD mode is applied that allows, in addition to motion vector information obtained from the merge candidate described above, motion vector information to be obtained by coding motion vector information of a difference in a prescribed direction.

An image decoding apparatus according to an aspect of the present invention includes a parameter decoder configured to decode a parameter for generating a prediction image, and the parameter decoder includes an MMVD prediction unit decoding an MMVD flag indicating whether an MMVD mode is applied that allows motion vector information to be obtained by decoding, from coded data, motion vector information of a difference in a prescribed direction, an index indicating a distance table, and an index used to select an element from the distance table, and adding a motion vector difference at a prescribed distance in a prescribed direction to a motion vector derived from a merge candidate to obtain a motion vector, and the MMVD prediction unit transforms the motion vector into integer accuracy in a case of selecting a particular element from the distance table.

With such a configuration, in a case that a large number of prediction parameters in skip flags indicate a case where no prediction residual is present, in a case that an image is coded with a high compression rate, the merge flag and the MMVD flag need not be decoded. This prevents coding efficiency from being reduced.

An image decoding apparatus according to an aspect of the present invention includes a prediction parameter decoder configured to decode a parameter for generating a prediction image, the prediction parameter decoder decodes a skip flag indicating that no prediction residual is present, and in a case that a prediction residual is present, then decodes a merge flag for implicitly obtaining motion vector information, and in a case that a merge mode is not applied, decodes an MMVD flag for obtaining, in addition to the motion vector information implicitly obtained, motion vector information by decoding, from coded data, motion vector information of a difference.

With such a configuration, in a case that a large number of prediction parameters in skip flags indicate a case where no prediction residual is present, at a low rate, the merge flag and the MMVD flag need not be decoded. This prevents coding efficiency from being reduced.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

REFERENCE SIGNS LIST

31 Image decoding apparatus
301 Entropy decoder
302 Parameter decoder
3020 Header decoder
303 Inter prediction parameter decoder
304 Intra prediction parameter decoder
308 Prediction image generation unit
309 Inter prediction image generation unit
310 Intra prediction image generation unit
311 Inverse quantization and inverse transform processing unit
312 Addition unit
11 Image coding apparatus
101 Prediction image generation unit
102 Subtraction unit
103 Transform and quantization unit
104 Entropy coder
105 Inverse quantization and inverse transform processing unit
107 Loop filter
110 Coding parameter determination unit
111 Parameter coder
112 Parameter coder
1110 Header coder
1111 CT information coder
1112 CU coder (prediction mode coder)
1114 TU coder

The invention claimed is:

1. A video decoding apparatus comprising,
a parameter decoding circuit configured to decode parameters for generating a prediction image in an MMVD mode; and
an MMVD prediction circuit configured to obtain motion vectors by adding an L0 vector difference or an L1 vector difference to motion vectors for merging,
wherein the parameter decoding circuit decodes a first index specifying an index in a merge candidate list, a second index specifying a length of the L0 vector difference or the L1 vector difference, and a third index specifying a direction of the L0 vector difference or the L1 the vector difference,
the MMVD prediction circuit
derives the motion vectors for merging from the first index,
derives a first vector from the second index and the third index,
in a case that a distance between a target picture and a L0 picture is greater than a distance between the target picture and a L1 picture, sets the L0 vector difference equal to the first vector, and derives the L1 vector difference by scaling the first vector,
in a case that a distance between a target picture and a L0 picture is less than a distance between a target picture and an L1 picture, sets the L1 vector difference equal to the first vector, and derives the L0 vector difference by scaling the first vector.

2. The video decoding apparatus according to the claim 1, wherein, in a case that a distance between a target picture and the L0 picture is equal to a distance between the target picture and the L1 picture, and both the L0 picture and the L1 picture are located in same direction against the target picture in time order, the MMVD prediction circuit sets the L0 vector difference and the L1 vector difference equal to the first vector.

3. A video decoding method comprising,
decoding parameters for generating a prediction image in an MMVD mode;
decoding a first index specifying an index in a merge candidate list, a second index specifying a length of an L0 vector difference or an L1 vector difference, and a third index specifying a direction of the L0 vector difference of the L1 vector difference;
deriving motion vectors for merging from the first index;
deriving a first vector from the second index and the third index;
in a case that a distance between a target picture and a L0 picture is greater than a distance between the target picture and a L1 picture, setting the L0 vector difference equal to the first vector, and deriving the L1 vector difference by scaling the first vector;
in a case that the distance between the target picture and the L0 picture is less than the distance between the target picture and the L1 picture, setting the L1 vector difference equal to the first vector, and deriving the L0 vector difference by scaling the first vector; and obtaining motion vectors motion vectors by adding the L0 vector difference or the L1 vector difference to the motion vectors for merging.

4. The video decoding apparatus according to the claim 1, wherein, in a case that the distance between the target picture and the L0 picture is equal to the distance between the target picture and the L1 picture, and the L0 picture, the target picture, and the L1 picture are arranged in time order, the MMVD prediction circuit sets the L0 vector difference equal to the first vector, and the L1 vector difference is set equal to a result of multiplying the first vector by −1.

5. A video coding apparatus comprising:

a parameter coding circuit configured to code parameters for generating a prediction image in an MMVD mode; and an MMVD prediction circuit configured to obtain motion vectors by adding an L0 vector difference or an L1 vector difference to motion vectors for merging; wherein the parameter coding circuit codes a first index specifying an index in a merge candidate list, a second index specifying a length of the L0 vector difference or the L1 vector difference, and a third index specifying a direction of the L0 vector difference or the L1 vector difference; and the MMVD prediction circuit:

derives the motion vectors for merging from the first index;

derives a first vector from the second index and the third index;

in a case that a distance between a target picture and a L0 picture is greater than a distance between the target picture and an L1 picture, sets the L0 vector difference equal to the first vector, and derives the L1 vector difference by scaling the first vector; and in a case that the distance between the target picture and the L0 picture is less than the distance between the target picture and the L1 picture, sets the L1 vector difference equal to the first vector, and derives the L0 vector difference by scaling the first vector.

* * * * *